United States Patent Office 3,511,124
Patented May 12, 1970

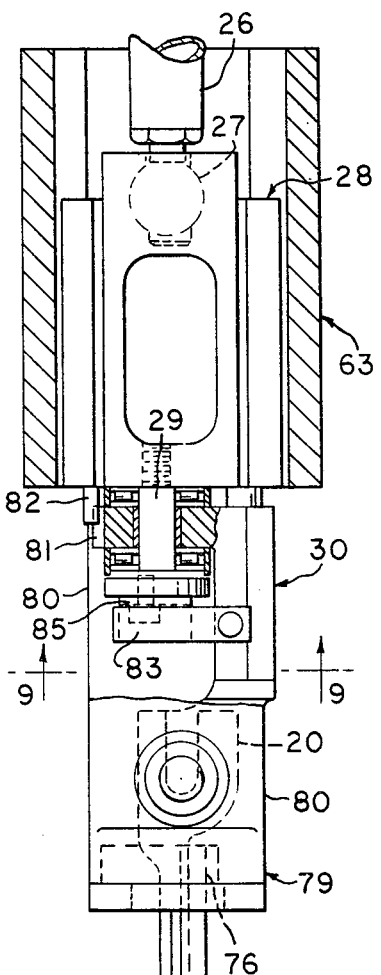
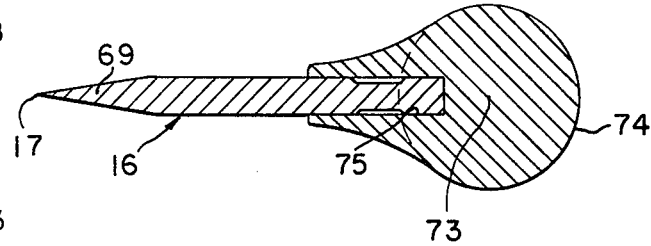
FIG. 5
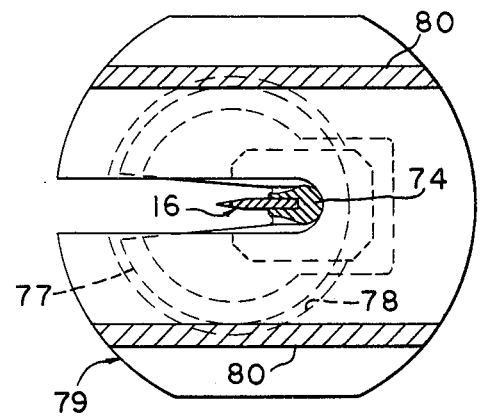
FIG. 6
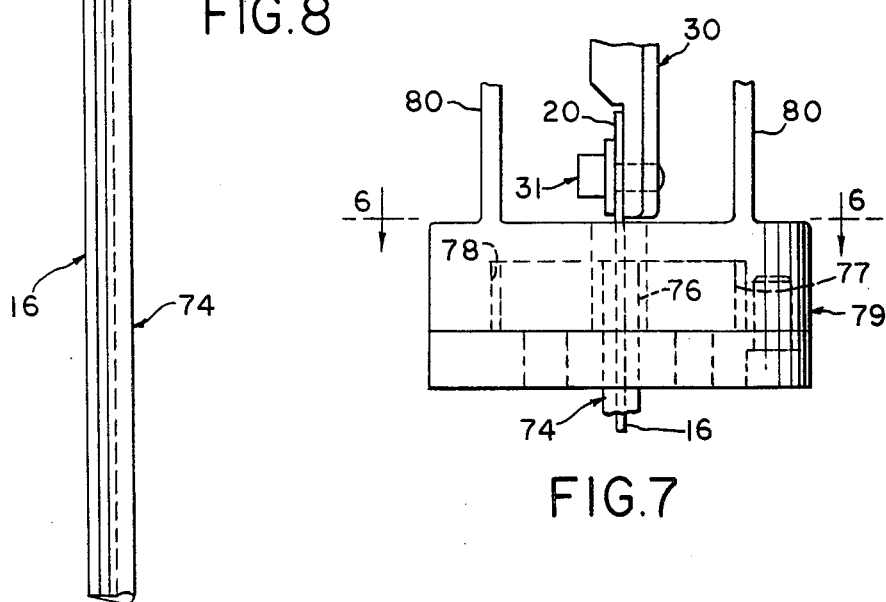
FIG. 8
FIG. 7

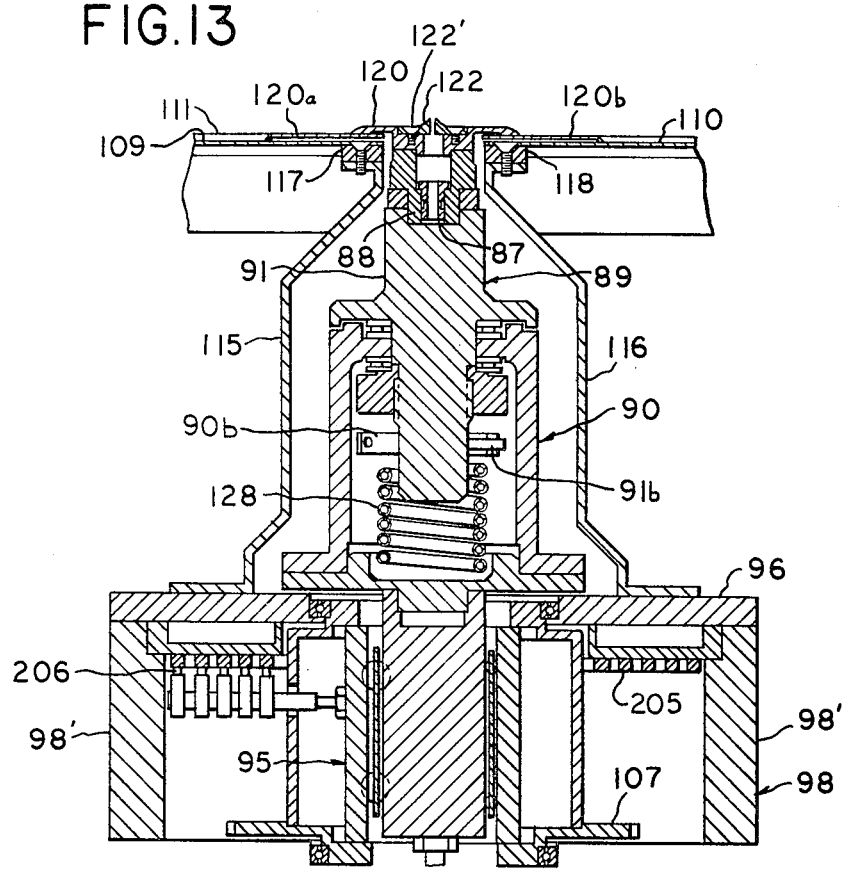
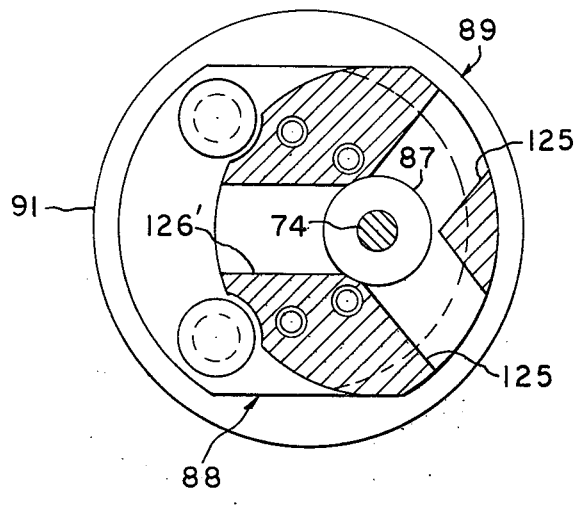

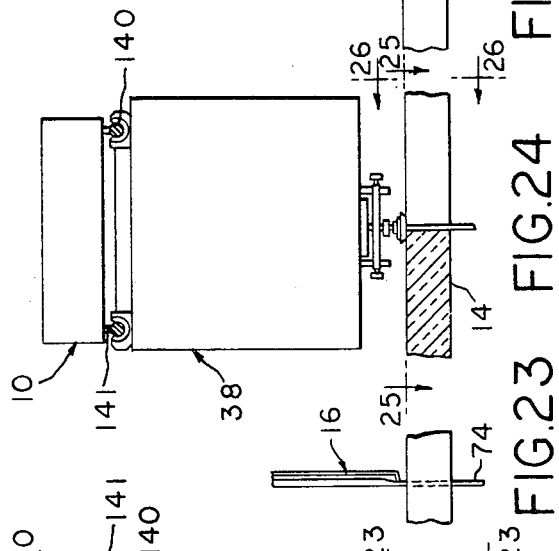
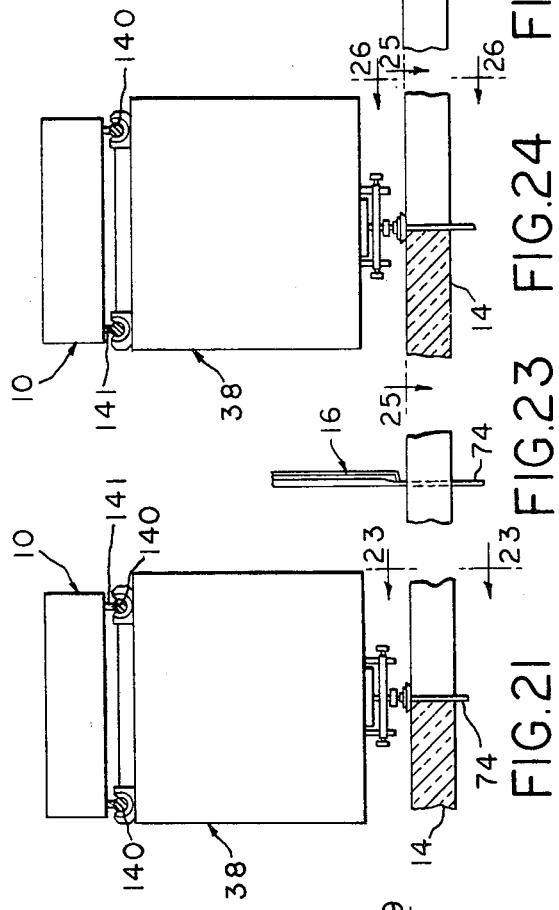
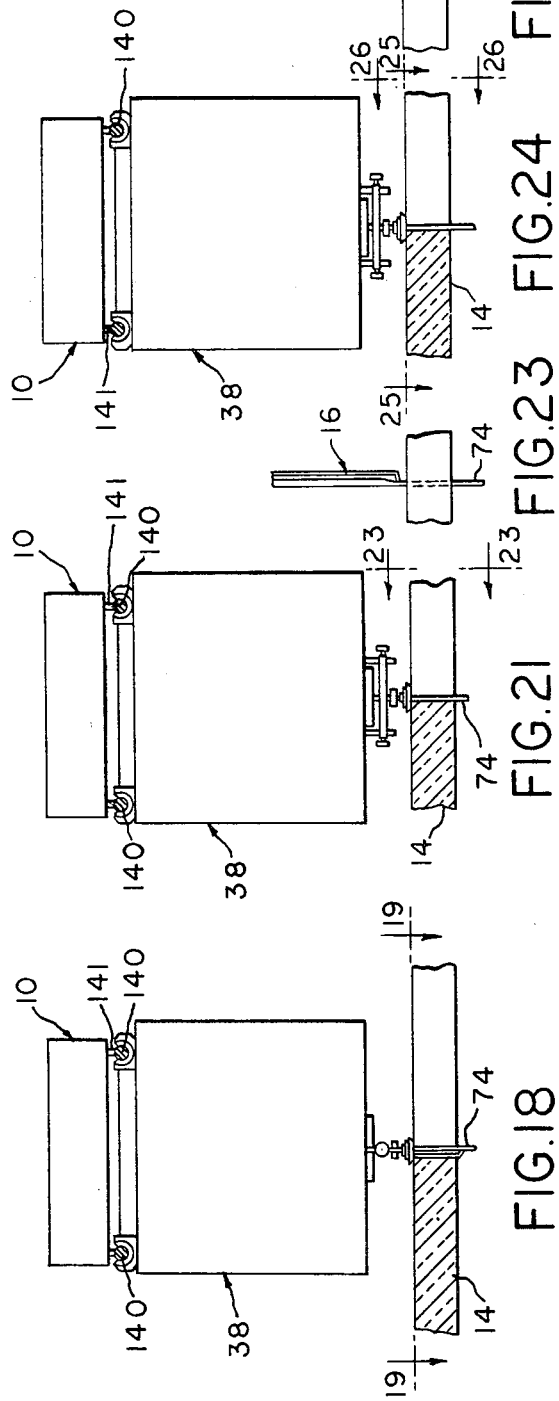
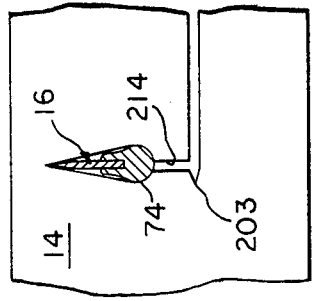
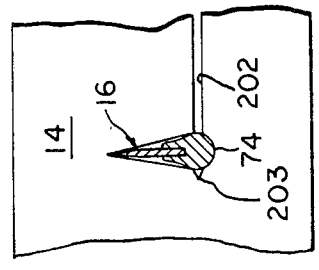
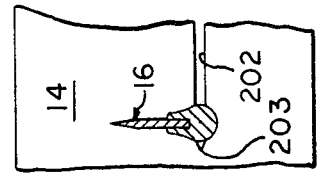
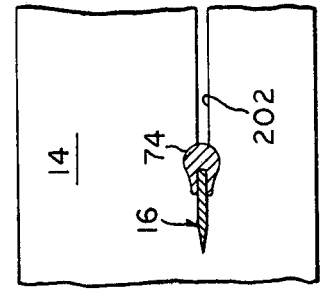
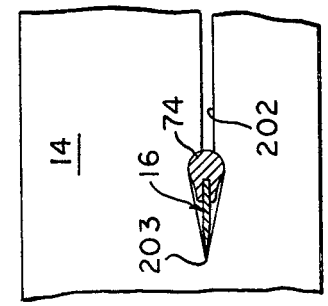

3,511,124
MATERIAL CUTTING MACHINE HAVING RECIPROCATING CUTTING BLADE WITH TWO AXES OF ROTATION
Edward C. Bruns, Cincinnati, Ohio, assignor to The Cincinnati Milling Machine Co., Cincinnati, Ohio, a corporation of Ohio
Filed May 6, 1968, Ser. No. 726,658
Int. Cl. B26d 5/02, 5/30, 7/00
U.S. Cl. 83—522
14 Claims

ABSTRACT OF THE DISCLOSURE

A material cutting machine has a reciprocating and vertically disposed cutting blade adapted to cut material, which is disposed in a horizontal plane. The cutting blade is adapted to be lifted from cutting engagement with the material being cut. The machine has means to rotate the cutting blade to change the heading of the cutting edge. The machine also has means to change the axis of rotation of the cutting blade in accordance with whether the cutting blade is in engagement with the material being cut or lifted from engagement with the material being cut.

---

In the copending patent application of George W. Sederberg for "Material Cutting Machine Having Reciprocating Cutting Blade," Ser. No. 636,965, filed May 8, 1967, and assigned to the same assignee as the assignee of the present application, there is shown a material cuting machine in which a reciprocating cutting blade is rotatable through 360° about an axis passing through a stiffening rod attached to the trailing edge of the cutting blade. In the aforesaid Sederberg application, it is necessary to rotate the motor, which reciprocates the cutting blade, and the support structure for the motor to rotate the cutting blade.

The motor and its support structure comprise a substantial mass in comparison with the mass of the cutting blade. Thus, the time required to rotate the cutting blade is determined by the mass of the motor and its support structure.

The present invention is an improvement over the material cutting machine of the aforesaid Sederberg application by eliminating the requirement for the motor and its support structure to be rotated to rotate the cuting blade. Thus, the total rotated mass when the cuting blade is to be rotated is substantially reduced by the material cutting machine of the present invention. Accordingly, the time required to rotate the reciprocating cutting blade of the present invention in comparison with rotation of the cutting blade of the aforesaid Sederberg application is substantially reduced. This permits faster operation of the material cutting machine of the present invention while still obtaining the desired results of the aforesaid Sederberg application.

In the material cutting machine of the aforesaid Sederberg application, the cutting blade is rotatable about the axis of the stiffening rod. Thus, when cutting relatively heavy material, the force created by the material against the cutting blade may cause turning of the cutting blade about the axis of the stiffening rod. As a result, with certain relatively heavy materials, the possibility exists that the cutting blade of the aforesaid Sederberg application may not maintain its desired heading. While this amount of heading may be slight, there are certain instances in which this slight deviation from the desired heading is undesirable.

The material cutting machine of the present invention satisfactorily overcomes this problem by utilizing a vertical axis adjacent the leading edge of the cutting blade for rotation of the cutting blade during cutting engagement with the material. As a result, any force exerted by relatively heavy material against the cutting blade of the present invention merely causes pivoting or turning about the axis adjacent the leading edge, which forms the cutting edge of the cuting blade of the present invention along with the bottom connecting edge in the same manner as in the aforesaid Sederberg application, so as to not remove the cutting blade from its desired heading. The present invention utilizes a second rotatable axis, which is the axis of the support rod and adjacent the trailing edge of the cutting blade, for turning the cutting blade when it is not in engagement with the material being cut.

An object of this invention is to provide a material cutting machine having a reciprocating cutting blade that may be rotated without its driving means rotating.

Another object of this invention is to provide a material cutting machine having a reciprocating cutting blade that rotates about a vertical axis adjacent its leading edge when cutting and about a vertical axis adjacent its trailing edge when the cutting blade is not in cutting engagement with the material being cut.

Other objects of this invention will be readily perceived from the following description, claims, and drawings.

This invention relates to a material cutting machine having a substantially vertical cutting blade for cutting material, which is supported in a substantially horizontal plane by suitable means. The cutting machine has motive means connected by means to the cutting blade to cause reciprocation of the cutting blade when the motive means is activated. The cutting machine also has means to remove the cutting blade from cutting engagement with the material being cut and means to rotate the cutting blade to change the heading of the cutting edge of the cutting blade. The machine has means to change the axis of rotation of the cutting blade in accordance with whether the cutting blade is in engagement with the material being cut or removed by the removal means from engagement with the material being cut.

The attached drawings illustrate a preferred embodiment of the invention, in which:

FIG. 5 is an enlarged sectional view of the cutting blade and its support rod;

FIG. 6 is a plan view, partly in section, of the support structure for the upper end of the guide rod for the cutting blade and taken along line 6—6 of FIG. 7;

FIG. 7 is a rear elevational view of the support structure for the upper end of the guide rod for the cutting blade and showing the connection of the upper end of the cutting blade to its support structure;

FIG. 8 is a side elevational view, partly in section, of a portion of the mechanism for connecting the cutting blade to its motive means;

FIG. 13 is a vertical sectional view of part of the lower support structure for the guide rod for the cutting blade and taken along line 13—13 of FIG. 12;

FIG. 15 is a sectional view of a portion of the structure of FIG. 10 and taken along line 15—15 of FIG. 10;

FIG. 18 is a side elevational view, partly in section, showing the cutting blade in cutting engagement with the material and forming a cut in the material;

FIG. 19 is a top plan view, partly in section, showing the cutting blade forming a cut in the material and taken along line 19—19 of FIG. 18;

FIG. 20 is a view, similar to FIG. 19, but showing the cutting blade shifted so that the longitudinal axis of the guide rod is its axis of rotation;

FIG. 21 is a view, similar to FIG. 18, but showing the cutting blade removed from cutting engagement with the material and rotated 90° from the position of FIG. 20;

FIG. 22 is a view, similar to FIG. 20, but showing the cutting blade rotated 90° from the position of FIG. 20;

FIG. 23 is a rear elevational view showing the relation of the cutting blade to the material and taken substantially along line 23—23 of FIG. 21 with parts omitted for clarity purposes;

FIG. 24 is a view, similar to FIG. 21, in which the cutting blade is in cutting engagement with the material;

FIG. 25 is a view, similar to FIG. 22, but showing the cutting blade in cutting engagement with the material and taken along line 25—25 of FIG. 24;

FIG. 26 is a rear elevational view of a portion of the cutting blade and the material of FIG. 24 and taken substantially along line 26—26 of FIG. 24 with parts omitted for clarity purposes;

FIG. 27 is a view, similar to FIG. 25, but showing the cutting blade advanced from the position of FIG. 25.

Figure 1:
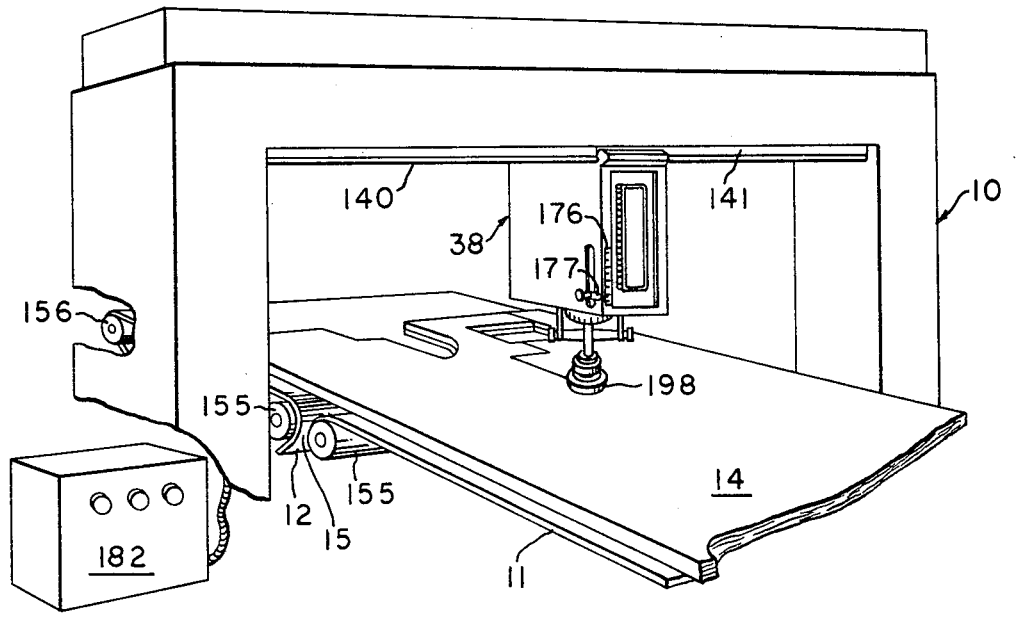
FIG. 1 is a perspective view of a portion of the material cutting machine of the present invention with some parts omitted for clarity purposes.

Referring to the drawings and particularly FIG. 1, there is shown a material cutting machine of the present invention. The material cutting machine includes stationary support means such as a bridge 10. A pair of endless bands or belts 11 and 12 is adapted to support material 14 thereon.

The endless bands 11 and 12, which are flexible and formed of any suitable material, are adapted to be driven in unison to move the material 14 thereon in a longitudinal direction and relative to the bridge 10. The endless bands 11 and 12 are spaced from each other to form a transverse passage or throat 15 therebetween for reception of a cutting blade 16.

The cutting blade 16 has its leading edge 17 sharpened to a point to form a cutting surface along its entire length. The cutting blade 16 also has an edge 18 (see FIG. 10), which connects the bottom end of the leading edge 17 with the bottom end of its trailing edge 19, sharpened to a point along its entire length. Thus, the cutting blade 16 has both the leading edge 17 and the connecting edge 18 sharpened to provide cutting surfaces whereby cutting of the material 14 occurs when the connecting edge 18 is moved into engagement with the material 14.

The cutting blade 16 has its upper end 20 (see FIGS. 7 and 8) attached through suitable connecting means to a motor 21 (see FIG. 2), which causes reciprocation of the cutting blade 16 with respect to the material 14 supported on the endless bands 11 and 12 to cut the material 14. The motor 21 has a flywheel or crank wheel 22 attached to its shaft.

The flywheel 22 has a spherical member 24 extending outwardly therefrom for disposition in an opening in the upper end of a hollow connecting rod 26 to form a spherical joint between the upper end of the connecting rod 26 and the spherical member 24. The lower end of the hollow connecting rod 26 has a ball 27 (see FIG. 8) extending therefrom for reception within a recess in a slider 28 to form a ball joint between the lower end of the hollow connecting rod 26 and the upper end of the slider 28.

The lower end of the slider 28 has a screw 29 extending downwardly therefrom on which is pivotally mounted a support member 30. The upper end 20 of the cutting blade 16 is secured to the lower end of the support member 30 by suitable means 31 (see FIG. 7) such as a screw.

Accordingly, the motor 21 is connected to the cutting blade 16. As the motor 21 rotates, the cutting blade 16 is reciprocated.

The motor 21 is fixedly secured to an upper portion 33 (see FIG. 2) of a vertically movable frame 34 for support thereby. The frame 34 is slidably supported on rods 35 (see FIG. 3), which extend between an upper plate or disk 36 (see FIG. 2) and a grinding wheel support frame 41.

The upper plate 36 forms the top wall of a housing 38 within which the motor 21 and the connecting means between the cutting blade 16 and the motor 21 are disposed. A lower plate 37 is fixedly secured to front wall 39 of the housing 38 and to the grinding wheel support frame 41.

The upper end of each of the rods 35 is permanently secured to the upper plate 36 through being pinned to a bushing 40, which is welded to the plate 36. The lower end of each of the rods 35 is permanently secured to the grinding wheel support frame 41 by a pin. Thus, the grinding wheel support frame 41 is fixedly secured to the upper plate 36 and supported thereby through the rods 35 being permanently secured to the upper plate 36 and the grinding wheel support frame 41.

Ball bearing bushings 42, which surround the rods 35, are disposed within an upstanding cylindrical part 43 of a lower portion 44 of the vertically movable frame 34. The lower end of each of the ball bearing bushings 42 is retained by a washer 45, which is fixedly secured to the lower portion 44 of the frame 34. The upper end of the ball bearing bushing 42 is retained by a washer 46, which is disposed between the top surface of the cylindrical part 43 and the bottom surface of the upper portion 33 of the frame 34. The ball bearing bushings 42 prevent shaking or vibration of the vertically movable frame 34 during any movement of the frame 34 away from its rest position. (This rest position is when the washers 45 are disposed on top of the grinding wheel frame 41 as shown in FIG. 2.)

Figure 2:
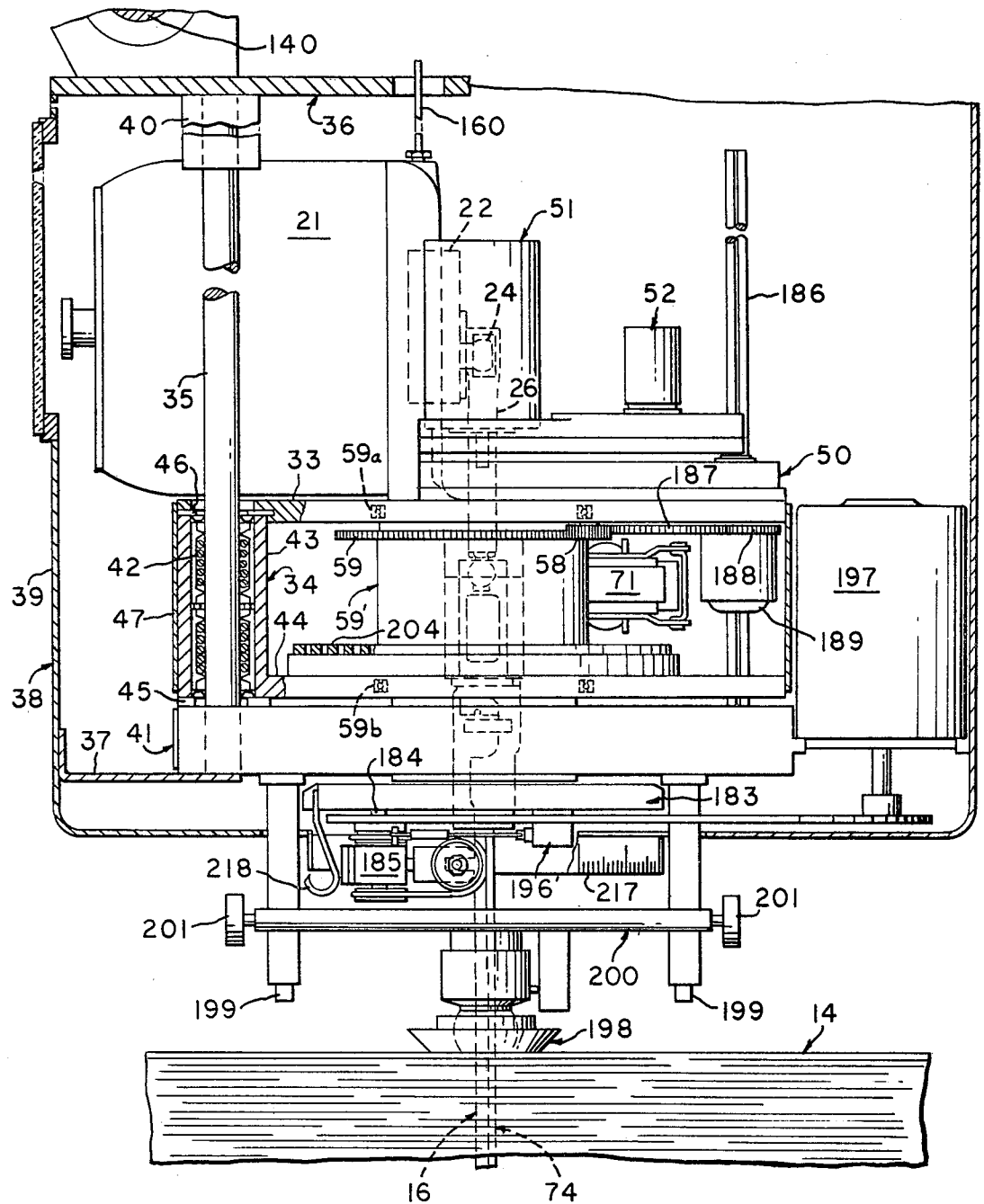
FIG. 2 is a side elevational view, partly in section, of a portion of the material cutting machine of the present invention with rod 35 and cooperating structure not in their true positions, corresponding to FIG. 3, for clarity purposes and some parts omitted for clarity purposes.
Figure 3:
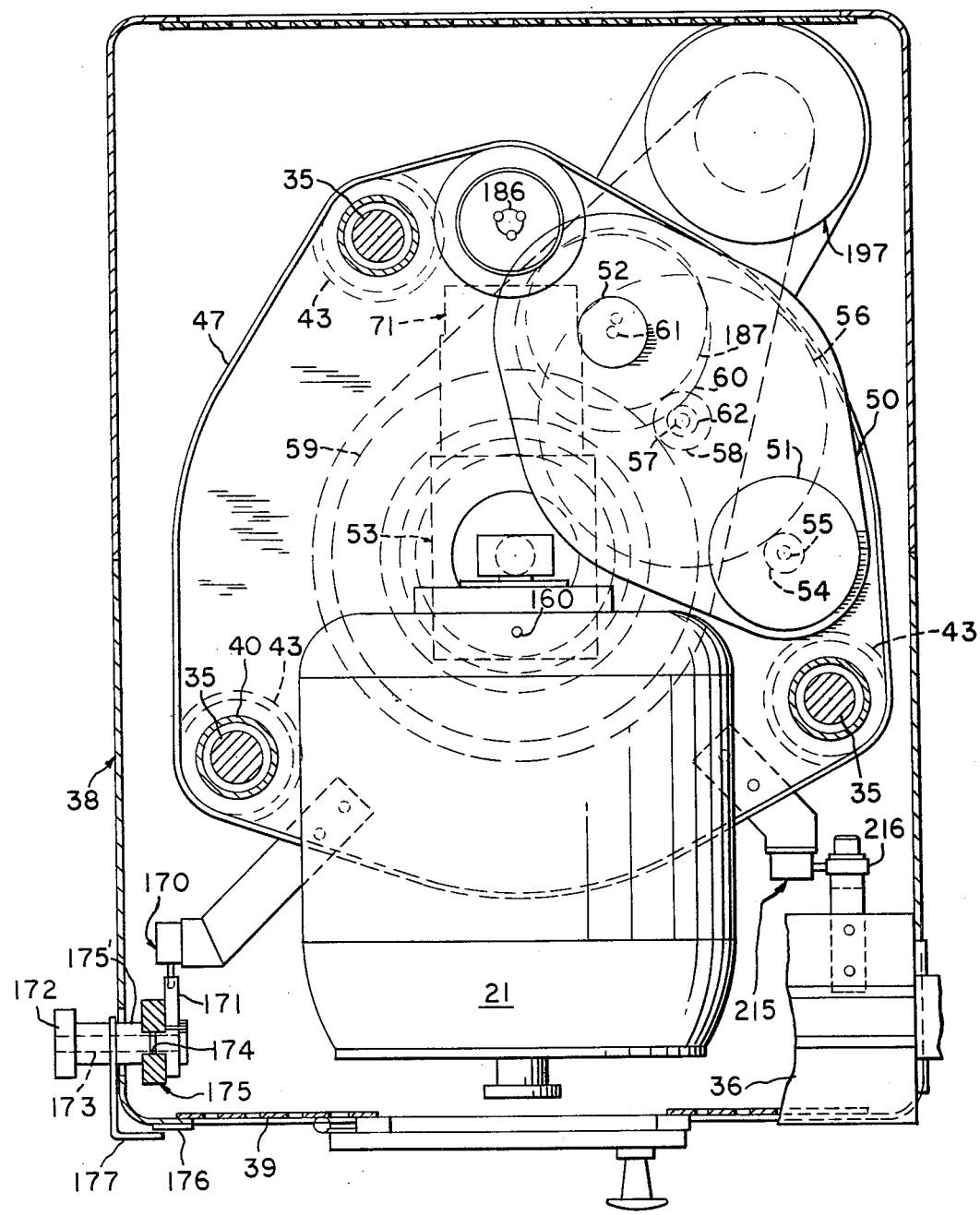
FIG. 3 is a top plan view, partly in section, of the structure of FIG. 2.

As shown in FIG. 2, the upper portion 33 and the lower portion 44 of the frame 34 are connected to each other by a thin continuous member 47. The member 47 extends from the upper portion 33 to almost the bottom of the lower portion 44 to make the frame 34 unitary.

The vertically movable frame 34 has a gear box 50 fixedly disposed on the upper surface of the upper portion 33 of the frame 34 for vertical movement therewith. The gear box 50 fixedly supports a motor 51 and a feedback resolver 52 on its upper surface.

A rotary box 53 (see FIGS. 3 and 4) is rotatably supported between the upper portion 33 and the lower portion 44 of the vertically movable frame 34. The rotary box 53 is adapted to be rotated by the motor 51.

Figure 14:
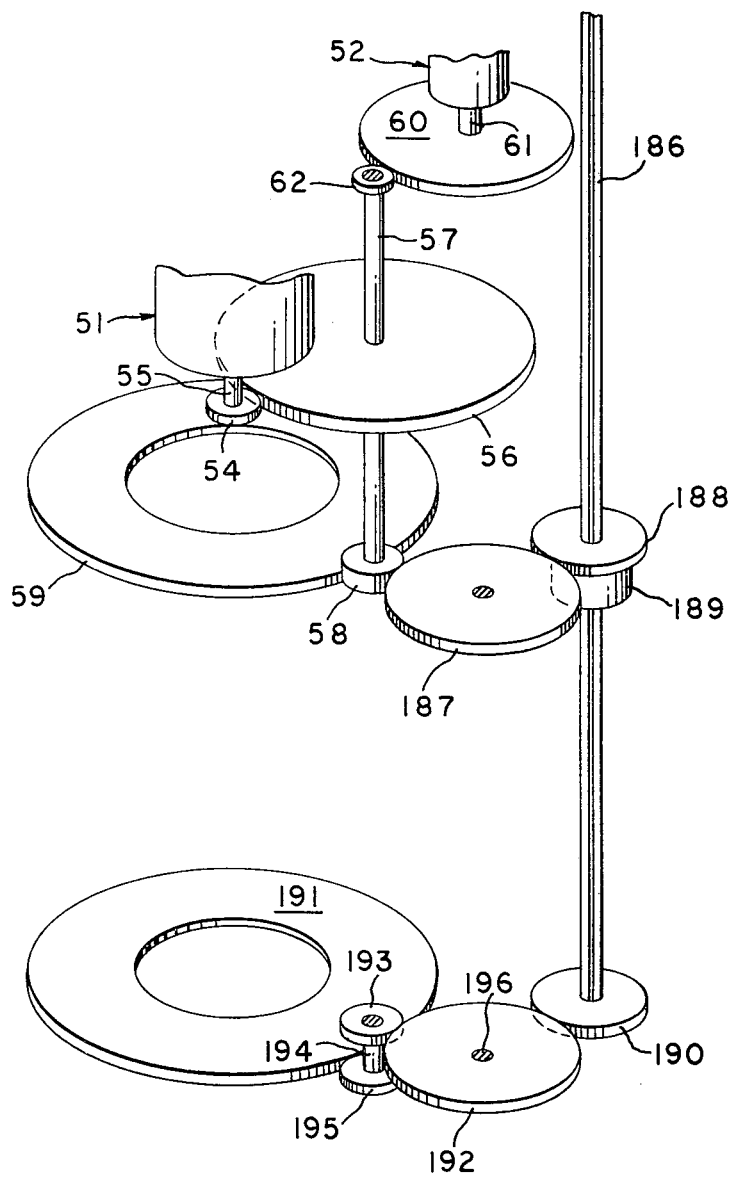
FIG. 14 is a schematic perspective view showing the gearing relation between various portions of the material cutting machine.

The drive from the motor 51 to the rotary box 53 is through a pinion gear 54 (see FIG. 14) on shaft 55 of the motor 51 meshing with a pinion gear 56 on a shaft 57, which is rotatably mounted within the gear box 50. The shaft 57 has a second pinion gear 58 meshing with a bull gear 59, which is fixedly secured to the rotary box 53. Accordingly, whenever the motor 51 is energized, the rotary box 53 is rotated.

The lower end of the rotary box 53 is fixedly secured to a cylindrical housing 59′, which surrounds the rotary box 53. With the bull gear 59 rotatably supported in the upper portion 33 of the frame 34 by a ball bearing assembly 59a (see FIG. 2) and the lower end of the housing 59′ rotatably supported in the lower portion 44 of the frame 34 by a ball bearing assembly 59b (see FIG. 2), the rotary box 53 is rotatably supported between the upper portion 33 and the lower portion 44 of the vertically movable frame 34.

The resolver 52 provides an electrical feedback signal to indicate the amount of rotation of the motor 51. Thus, a pinion gear 60 is mounted on shaft 61 of the resolver 52 to rotate the resolver 52 with the motor 51 due to the pinion gear 60 meshing with a pinion gear 62 on the shaft 57.

Figure 4:
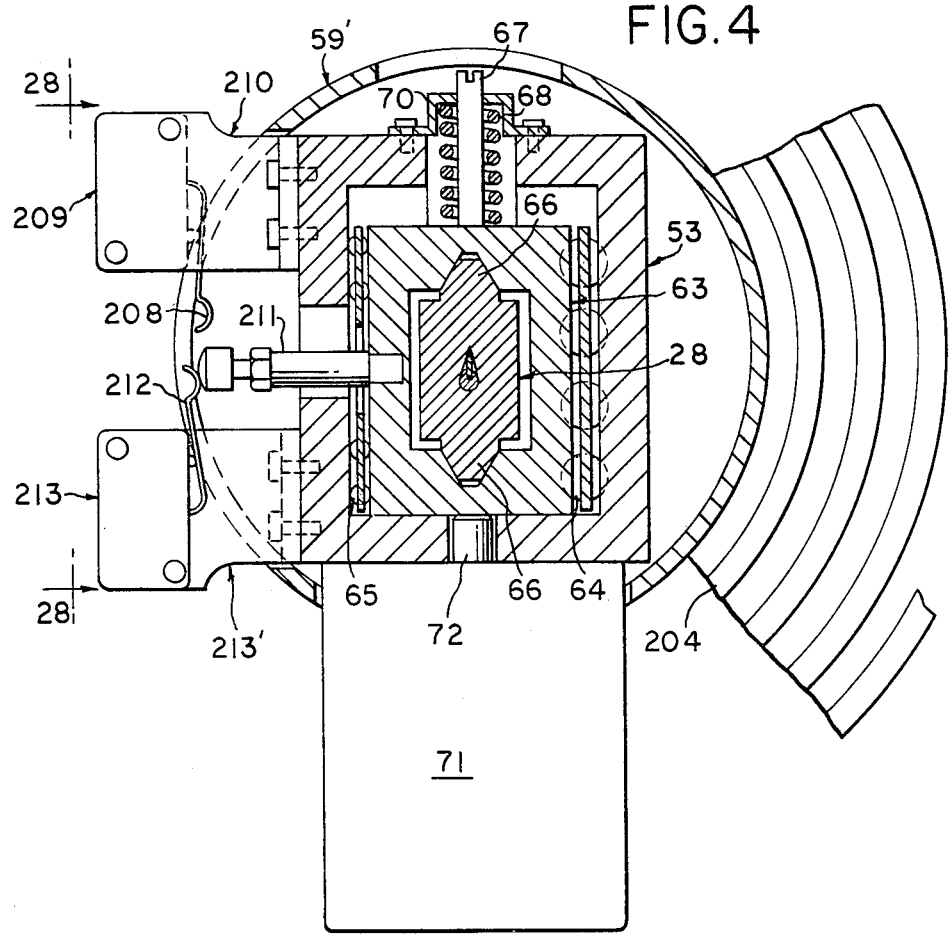
FIG. 4 is a sectional view, partly in plan, of the mechanism for moving the cutting blade from one axis of rotation to its other axis of rotation.

As shown in FIG. 4, the rotary box 53 has a substantially rectangular guide member 63 supported therein by bearings 64 and 65 acting against opposite sides of the guide member 63. The guide member 63 has V-shaped receptacles or passages extending longitudinally therethrough to receive V-shaped ways 66 on opposite sides of the hollow slider 28. Since the rotary box 53 is mounted so that the V-shaped passages in the guide member 63 are always vertically disposed, the slider 28 will always move vertically irrespective of the position of the connecting rod 26 due to the ability of the connecting rod 26 to move with respect to the flywheel or crank wheel 22 and the slider 28. Accordingly, rotation of the motor 21 results in reciprocation of the cutting blade 16 in a vertical plane.

The guide member 63 has a pin 67 extending from one of its sides, which does not have the bearings 64 and 65 in contact therewith, and through the rotary box 53. A spring 68 surrounds the pin 67 and continuously urges the guide member 63 to a position in which rotation of the rotary box 53 occurs about a vertical axis 69 (see FIG. 5) disposed adjacent the leading edge 17 of the cutting blade 16. As shown in FIG. 4, the spring 68 has one end bearing against the guide member 63 and its other end bearing against a spring retaining cap 70, which is secured to the rotary box 53.

The rotary box 53 has a solenoid 71 attached to the opposite side thereof from the retaining cap 70. The solenoid 71 has a plunger 72 extending therefrom through the rotary box 53 and bearing against the side of the guide member 63 opposite from the pin 67. Accordingly, when the solenoid 71 is energized, the guide member 63 is moved against the force of the spring 68 to a position in which the guide member 63 and the slider 28 rotate about a vertical axis 73, which is adjacent the trailing edge 19 of the cutting blade 16.

As shown in FIG. 5, the vertical axis 73 is the axis of a stiffening or guide rod 74, which has a slot 75 therein to receive the trailing edge 19 of the cutting blade 16. Thus, the cutting blade 16 may reciprocate relative to the stiffening or guide rod 74 while the rod 74 rotates with the cutting blade 16.

As shown in FIGS. 6 and 7, the stiffening rod 74 has its upper end 76 attached to a swivel 77, which is supported within a recess 78 in the lower end of a support member 79. The support member 79 has a pair of legs 80, which are connected to the lower end of the guide member 63. The legs 80 have the support member 30 disposed therebetween (see FIG. 7). Suitable low friction material may be disposed between the swivel 77 and the wall of the recess 78 to permit the swivel 77 to turn freely.

Accordingly, the cutting blade 16 may pivot about the vertical axis 69 when the cutting blade 16 is in cutting engagement with the material 14 since the stiffening rod 74 is free to swivel. The amount of pivotal movement of the cutting blade 16 about the axis 69 during cutting of the material 14 is limited through the support member 30 having a groove or slot 81 (see FIG. 8) within which is disposed a stop pin 82 extending downwardly from the slide 28. The size of the slot or groove 81 with respect to the diameter of the pin 82 is such that the cutting blade 16 is capable of pivoting only approximately 5° from each side of its null position during cutting of the material 14 by the cutting blade 16.

Figure 9:
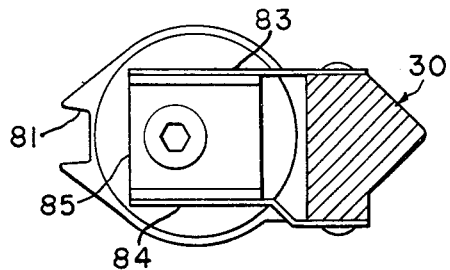
FIG. 9 is a plan view, partly in section, of means for retaining the cutting blade in its null position and taken along line 9—9 of FIG. 8.

As shown in FIGS. 8 and 9, the support member 30 has a pair of flat leaf springs 83 and 84 extending therefrom and disposed on opposite sides of a substantially rectangular projection 85, which extends downwardly from the screw 29. Accordingly, when no cutting force is exerted on the cutting blade 16, the springs 83 and 84 maintain the cutting blade 16 in its null or zero position.

Lower end 86 of the stiffening rod 74 is cylindrical shaped and extends through a bushing 87 (see FIG. 10), which is fixedly supported within a support block 88 of a support unit 89. Although the stiffening rod 74 does not reciprocate with the cutting blade 16, it must be capable of sliding relative to the bushing 87 when the cutting blade 16, the motor 21, and the connecting means are lifted to remove the cutting blade 16 from cutting engagement with the material 14. Accordingly, the stiffening rod 74 must be slidably supported within the bushing 87.

It is necessary for the stiffening rod 74, the bushing 87, the support block 88, the support unit 89, and the related connected structure to rotate whenever the cutting blade 16 rotates. This is necessary to maintain the slot 75 in the stiffening rod 74 aligned with the cutting blade 16.

Accordingly, suitable structure must be provided to rotate the support unit 89 and related structure the same amount as the rotary box 53. Likewise, the support unit 89 must be capable of being moved laterally in the same manner and the same distance as the guide member 63 is moved when the solenoid 71 is energized.

The support unit 89 is carried by a hollow support member 90 (see FIGS. 12 and 13), which supports a downwardly extending member 91 of the support unit 89 on its upper end. The member 91 has a central portion 92 supported by needle bearings 93 to permit swiveling of the member 91 with respect to the member 90 when the cutting blade 16 has a cutting force exerted thereon. The amount of swiveling of the member 91 is approximately 5° from each side of a null position. This is necessary to permit the support unit 89 to swivel whenever the cutting blade 16 swivels due to a cutting force being exerted thereon.

The support member 90 has a slot therein to receive a pin 91a on the member 91 of the support unit 89 to limit the swiveling to approximately 5° from each side of the null position. The support member 90 has springs 90b, which cooperate with a pin 91b on the member 91 for retaining the member 91 in the null position when no cutting force is exerted on the cutting blade 16.

Figure 12:
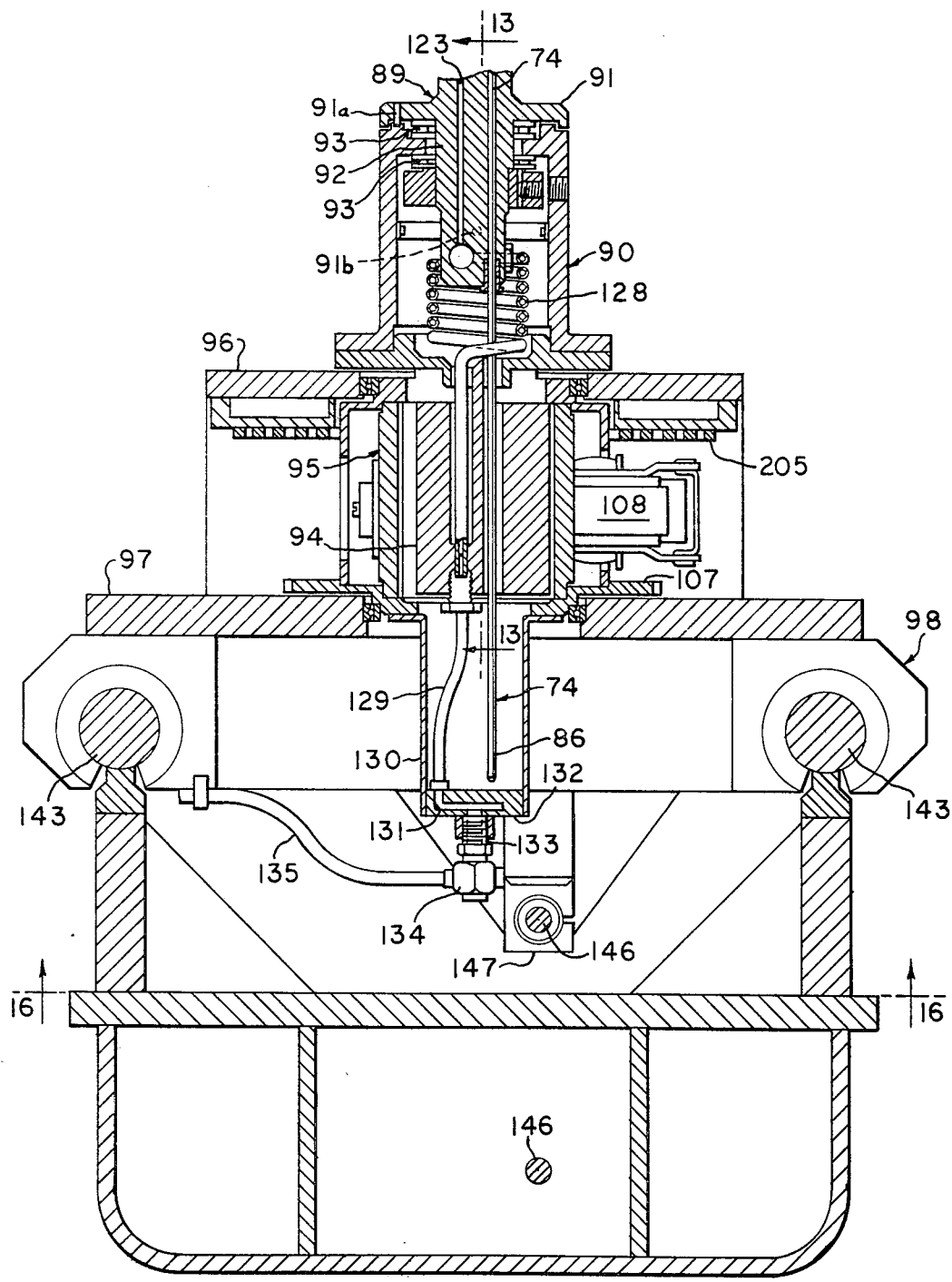
FIG. 12 is a vertical sectional view of the lower support structure for the guide rod for the cutting blade and its support means.

As shown in FIG. 12, the hollow support member 90 is fixedly connected to a guide member 94 of a rotary box 95, which carries the guide member 94 in the same manner as the rotary box 53 carries the guide member 63. The lower end 86 of the stiffening rod 74 extends through the guide member 94 when the cutting blade 16 is in cutting engagement with the material 14.

Since the rotary box 95 is mounted so that the passage within the guide member 94 for the stiffening rod 74 is always vertically disposed, the stiffening rod 74 will always move vertically. This insures that the stiffening rod 74 does not prevent the cutting blade 16 from reciprocating in a vertical plane when the motor 21 rotates.

Figure 16:
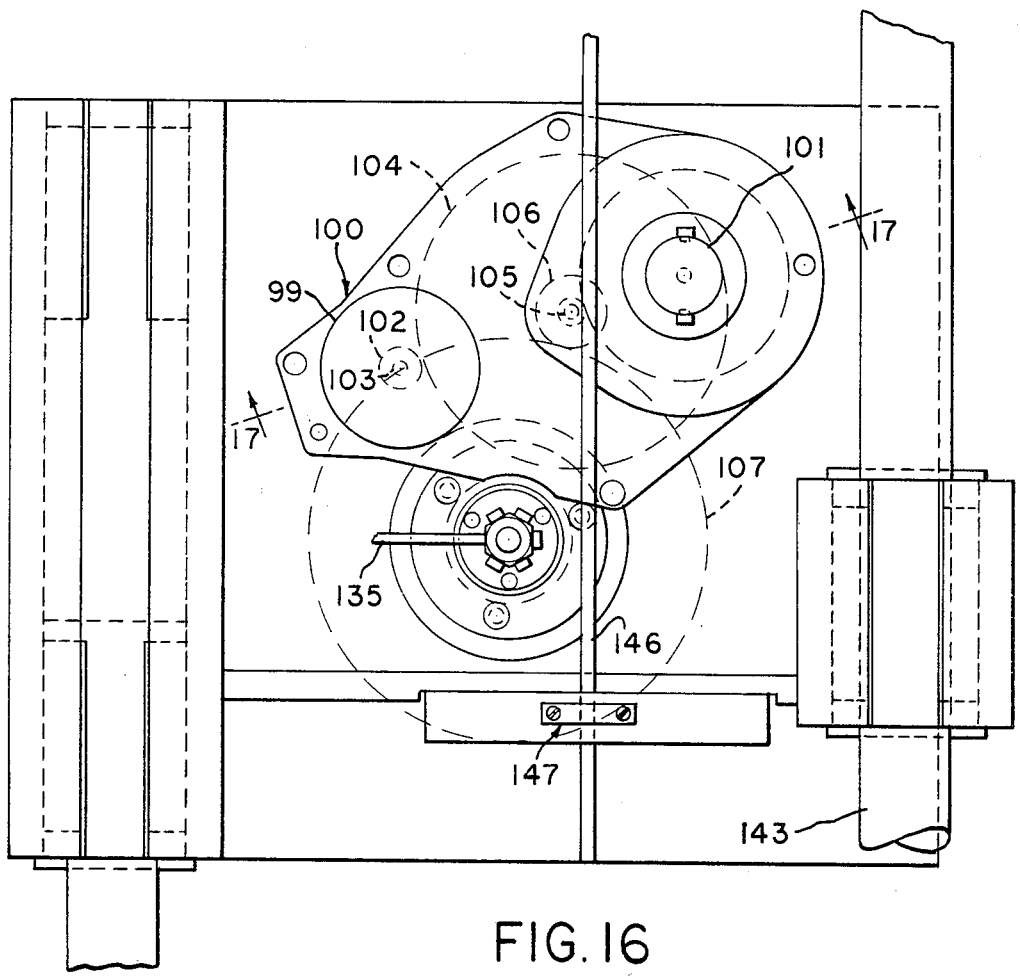
FIG. 16 is a plan view of the bottom portion of the lower support structure for the guide rod for the cutting blade to show the connection of the cable to the lower support structure and the gear box and taken along line 16—16 of FIG. 12.
Figure 17:
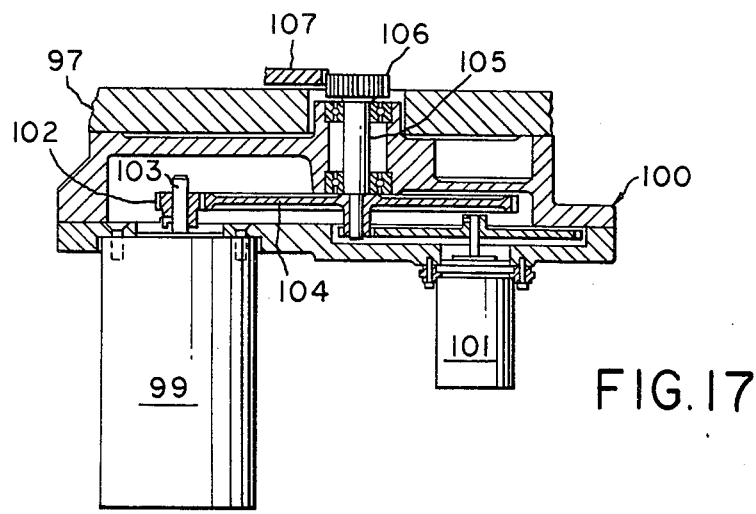
FIG. 17 is a sectional view of the gear box for the lower support structure and taken along line 17—17 of FIG. 16.

The rotary box 94 is rotatably supported between an upper portion 96 and a lower portion 97 of a lower support frame 98. The portions 96 and 97 are secured together by vertical members 98'. The rotary box 95 is adapted to be rotated by a motor 99, which is fixedly supported on a gear box 100 (see FIGS. 16 and 17).

The gear box 100 is fixedly supported on the lower portion 97 of the lower support frame 98. The gear box 100 also supports a feedback resolver 101.

The drive from the motor 99 to the rotary box 95 is through a pinion gear 102 (see FIG. 17) on shaft 103 of the motor 99 meshing with a pinion gear 104 on a shaft 105, which is rotatably mounted within the gear box 100. The shaft 105 has a second gear 106 mounted thereon and meshing with a bull gear 107 (see FIG. 12), which is fixedly secured to the rotary box 95. Accordingly, whenever the motor 99 is energized, the rotary box 95 is rotated.

The rotary box 95 has a solenoid 108 attached thereto in the same manner as the solenoid 71 is attached to the rotary box 53. It should be understood that a spring acts on the guide member 94 in the same manner as the spring 68 acts on the guide member 63. Thus, energization of the solenoid 108 moves the guide member 94 in the same manner as energization of the solenoid 71 moves the guide member 63. Accordingly, by simultaneously energizing the solenoids 71 and 108, the guide members 63 and 94 will be moved simultaneously to insure that the stiffening rod 74 is moved with the cutting blade 16 when the cutting blade 16 is moved from the position in which it rotates about the vertical axis 69 to the position in which it rotates about the vertical axis 73.

The structure for closing the throat or passage 15 includes a pair of spring tapes 109 and 110 (see FIGS. 11 and 13) that are similar to those shown and described in my copending patent application for "Gap Closure For Material Cutting Machine," Ser. No. 636,964, filed May 8, 1967, and assigned to the same assignee as the assignee of the present application. As more particularly shown and described in my aforesaid application, each of the spring tapes 109 and 110 is wound around drums 109' and 110' (see FIG. 11), respectively. The width of each of the spring tapes is greater than the distance between throat way sections 111 and 112.

Figure 10:
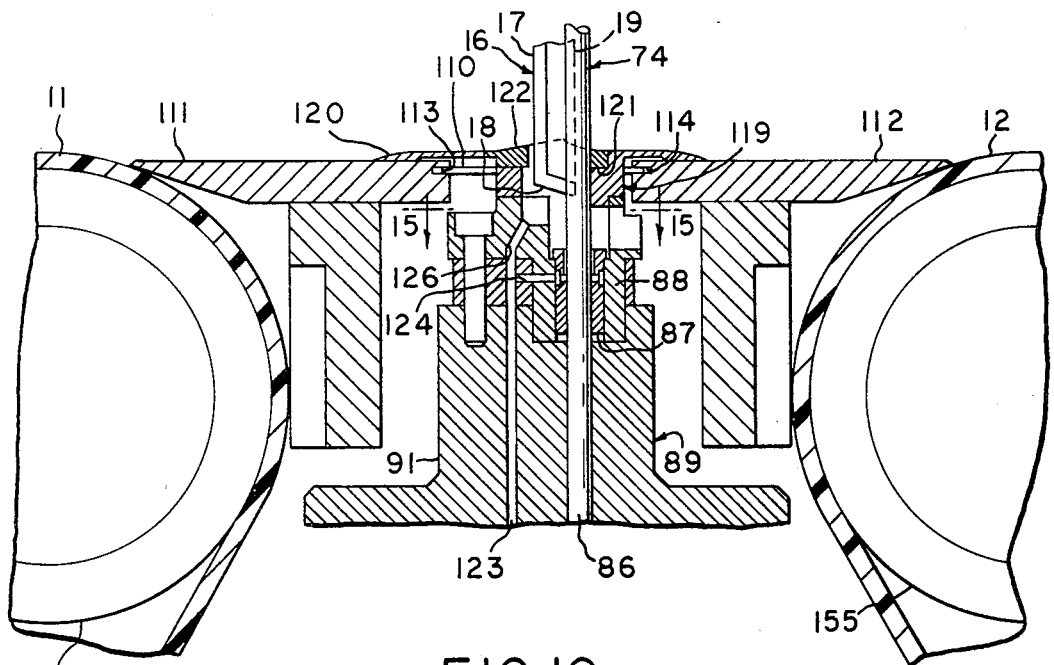
FIG. 10 is a sectional view of a structure for closing the transverse passage between the two endless belts on which the material is supported.

As shown in FIG. 10, the throat way sections 111 and 112 have slots 113 and 114, respectively, therein to receive the opposite edges of each of the tapes 109 and 110. It should be understood that the edges of each of the tapes 109 and 110 are disposed in both of the slots 113 and 114.

The tapes 109 and 110 are secured to the lower support frame 98 so that the tapes 109 and 110 are responsive only to transverse movements of the support unit 89 and not to movements of the support unit 89 due to changing the axis of rotation of the cutting blade 16. As previously mentioned, the support unit 89 may move relative to the lower support frame 98 to change the axis of rotation of the cutting blade 16.

The tapes 109 and 110 are secured to the upper portion 96 of the lower support frame 98 by brackets 115 and 116 (see FIG. 13), respectively. The brackets 115 and 116, respectively, are secured at their upper ends to blocks 117 and 118, respectively, which are fixed to the ends of the tapes 109 and 110, respectively. The lower ends of the brackets 115 and 116 are fixedly attached to the upper portion 96 of the lower support frame 98.

The unit 89 has a sleeve 119 (see FIG. 10) mounted thereon through which the cutting blade 16 and the stiffening rod 74 extend. The sleeve 119 has an annular flange 120, which overrides portions of the throat way sections 111 and 112 adjacent the gap therebetween.

The flange 120 also overlies portions 120a and 120b, which are fixed to the tapes 109 and 110, respectively. The portions 120a and 120b are disposed in the same horizontal plane as the top surfaces of the throat way sections 111 and 112. The portions 120a and 120b must be narrowerer in width than the tapes 109 and 110 so as to fit between the throat way sections 111 and 112.

The sleeve 119 has a support surface 121 formed therein to support an insert 122, which is retained within the sleeve 119 by suitable means such as screws 122' (see FIG. 13), for example. The insert 122 has a recess therein to receive the connecting edge 18 of the cutting blade 16 and the lower end of the leading edge 17 when the cutting blade 16 is in its lowermost position.

With the annular flange 120 of the sleeve 119 having an outer diameter sufficient to completely close the gap between the throat way sections 111 and 112 adjacent the cutting blade 16 and the tapes 109 and 110 extending beneath the annular flange 120 as shown in FIG. 13, the only opening is the small recess within the insert 122 into which the bottom of the cutting blade 16 and the stiffening rod 74 extend. Therefore, the material 14 is easily moved from the endless band 11 to the endless band 12 and vice versa without either end of the material 14 being disrupted in its movement by the transverse passage 15.

As shown in FIG. 10, the annular flange 120 has a tapered surface from its outer edge towards its center. Similarly, the insert 122 has a conical central area through which the cutting blade 16 and the stiffening rod 74 extend. This permits easy movement of the material from the throat way section 111 or 112 to the annular flange 120 without the material 14 having its longitudinal movement retarded.

Since particles of the material 14 may fall downwardly into the support unit 89, it is desired to be able to remove these particles of the material 14. Thus, a suitable air flow arrangement is provided to direct air into the interior of the support unit 89 to remove any particles of the material 14 therefrom.

The air flow arrangement includes an air inlet passage 123 in the unit 89. The passage 123 communicates through a passage 124 in the unit 89 to an area between portions of the bushing 87 and adjacent the stiffening rod 74. This air forces any particles of the material 14 upwardly. The particles escape through passages 125 (see FIG. 15) in the support block 88 of the support unit 89.

The passage 123 also communicates through a passage 126 in the support block 88 with a chamber 126' having the bottom of the cutting blade 16 and a portion of the stiffening rod 74 therein. The air, which enters into this chamber 126' from the passage 126, exits through the passages 125 in the support block 88. This also results in the particles of the material 14 being removed from the support unit 89.

The passage 123 extends through the central portion 92 of the member 91 and has its lower end communicating through a fitting to the upper end of a flexible tubing 128 (see FIG. 12). The tubing 128 extends into a passage in the guide member 94 and connects within the guide member 94 to the upper end of a tubing 129, which is plastic.

The tubing 129 is disposed within a hollow cap 130, which is supported for rotation with the rotary box 95. Thus, this insures that the plastic tubing 129 and the flexible tubing 128 rotate with the rotary box 95 whereby there is no twisting of the connection therebetween. Of course, the flexible tubing 128 is capable of permitting the slight amount of movement of the guide member 94 relative to the rotary box 95 and the hollow cap 130. It also permits the approximately 5° of swiveling from the null position of the member 91 relative to the member 90.

The tubing 129 communicates through a passage 131 in bottom end 132 of the hollow cap 130. The passage 131 communicates with a longitudinal passage in a bolt 133, which is threadedly connected to the bottom end 132 of the cap 130 and supports a rotary elbow 134 thereon. The rotary elbow 134 has a tubing 135 connected thereto for communication with the longitudinal passage within the bolt 133.

The tubing 135 is connected to a suitable source of air under pressure. Since the tubing 129 moves with the rotary box 95 during any rotation thereof, air may be supplied to the passage 123 irrespective of the position of the rotary box 95. That is, because of the rotary elbow 134, the tubing 135 will remain connected to the passage within the bolt 133 through 360° of rotation of the rotary box 95. Furthermore, since the rotary box 95 moves transversely with the cutting blade 16 due to the cutting blade 16 moving transversely through the passage 15, the hose 135 follows this movement.

Accordingly, when the motors 51 and 99 are energized, rotation of the cutting blade 16 and the stiffening rod 74 occurs together. Because of the spherical joint at the upper end of the hollow connecting rod 26 and the ball joint at the lower end of the hollow connecting rod 26, power from the motor 21 still reciprocates the cutting blade 16. The rotation occurs irrespective of whether rotation occurs about the vertical axis 69 or the vertical axis 73. In either position, the motor 21 reciprocates the cutting blade 16.

As shown in FIGS. 1 and 18, the housing 38 is slidably supported on a pair of horizontally disposed and transversely extending guide rails or ways 140, which are supported and carried by the bridge 10. Accordingly, movement of the housing 38 along the cylindrical ways 140, which have their longitudinal axes substantially parallel to the transverse passage 15, will cause movement of the cutting blade 16 through the transverse passage or throat 15, which is formed between the endless bands 11 and 12.

The upper plate 36 of the housing 38 carries ball bearing bushings that ride on the ways 140, which are supported from the bridge 10 by continuous support members 141. The ball bearing bushings permit the housing 38 to slide on the ways 140. One suitable example of the ball bearing bushings is the ball bearing bushing sold as Model OPN by Thomson Industries, Inc.

The lower support frame 98 is adapted to slide along lower guide rails or ways 143 (see FIGS. 12 and 16) of the bridge 10 through ball bearing bushings. The lower cylindrical guide ways 143 have their longitudinal axes disposed substantially parallel to the longitudinal axes of the upper ways 140. Accordingly, the housing 38 and the lower support frame 98 may be moved parallel to each other in a transverse direction relative to the endless bands 11 and 12.

Figure 11:
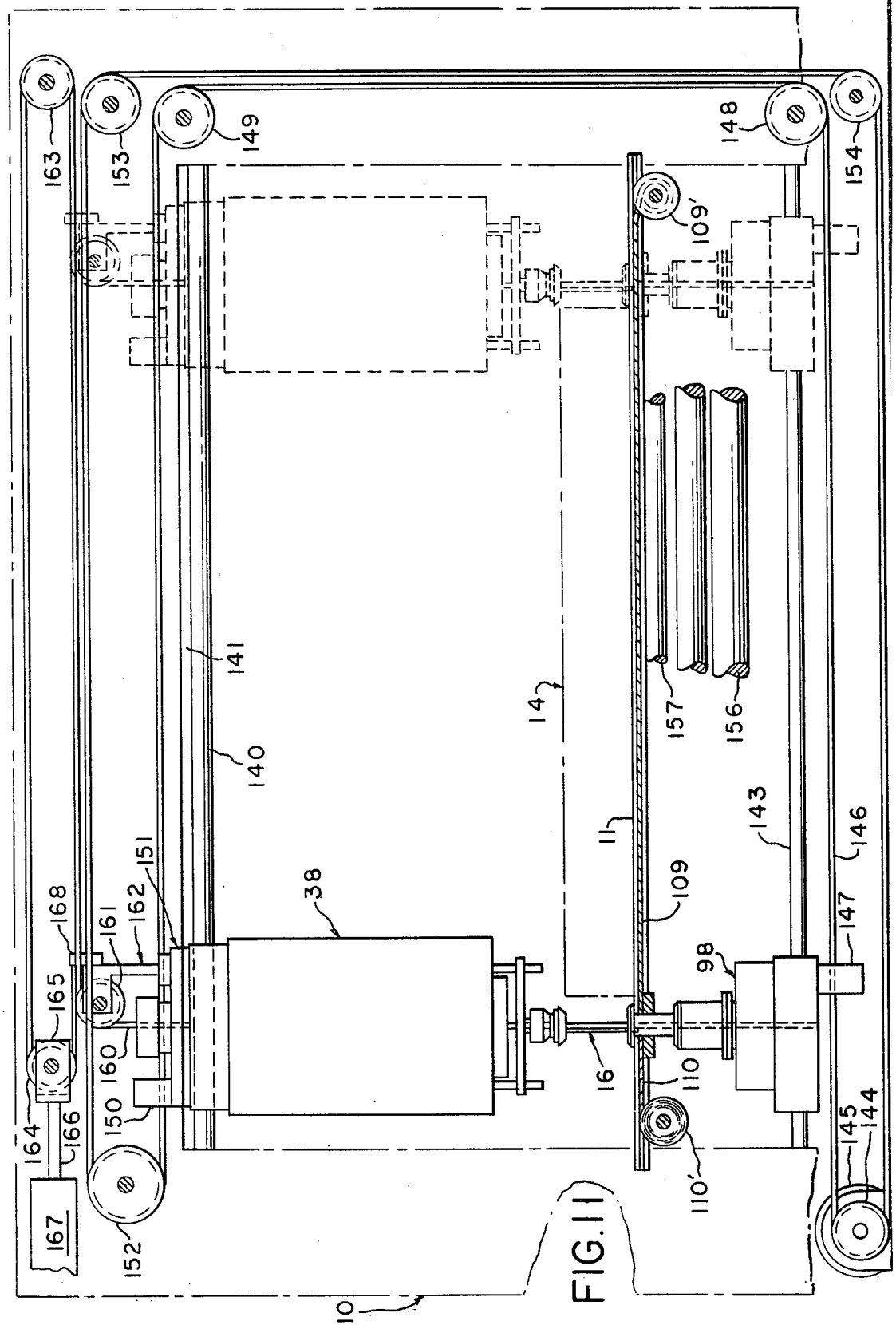
FIG. 11 is an elevational view, partly in section, of the cutting blade support structure and the mechanisms for lifting the cutting blade from cutting engagement with the material and moving the cutting blade transversely.

An apparatus for moving the housing 38 and the lower support frame 98 so that the cutting blade 16 traverses the transverse passage or throat 15 is shown in FIG. 11. The apparatus includes a drum 144, which is driven by a reversible motor 145. A continuous cable 146 has its ends attached to the drum 144 and is wound around the drum 144 by being disposed in helical grooves therein.

The cable 146 extends from the drum 144 through clamping means 147 (see FIG. 16) on the lower support frame 98 and is fixedly attached thereto by having an enlarged metallic member thereon clamped within the clamping means 147. After leaving the clamping means 147, the cable 146 passes around a pulley 148, which is rotatably mounted on the bridge 10.

The cable 146 extends upwardly within one of the hollow support standards of the bridge 10 and passes around a pulley 149, which is rotatably mounted on the bridge 10. The cable 146 then passes through clamping means 150 in an extension 151 of the housing 38 and is fixedly secured to the clamping means 150 by having an enlarged metallic member thereon clamped within the clamping means 150.

The cable 146 then passes around a pulley 152, which is rotatably mounted on the bridge 10. The cable 146 next extends around a pulley 153, which is rotatably mounted on the bridge 10 above the pulley 149. From the pulley 153, the cable 146 extends downwardly within the hollow support standard of the bridge 10 through which it extended upwardly. The cable 146 then passes around a pulley 154, which is rotatably mounted on the bridge 10 beneath the pulley 148, and returns to the drum 144.

Accordingly, actuation of the motor 145, which is preferably hydraulic, causes rotation of the drum 144 to move the housing 38 and the lower support frame 98 together along the upper ways 140 and the lower ways 143, respectively, whereby the cutting blade 16 traverses the transverse passage or throat 15 to cut the material 14, which is supported on the endless bands 11 and 12. In order to move the cutting blade 16 from the solid line position of FIG. 11 to the phantom line position, the drum 144 is rotated clockwise. This winds the lower part of the cable 146 on the drum 144 and unwinds the upper part of the cable 146.

Each of the endless bands 11 and 12 is received over a pair of horizontally spaced guide rollers 155 and 156 (see FIG. 1) with the rollers 155 for the bands 11 and 12 being disposed adjacent the transverse passage or throat 15. A plurality of horizontally spaced support rollers 157 (one shown for the band 11 in FIG. 11) is supported for rotation between parallel side plates or rails of the table structure and is adapted to support the endless band 11 as more particularly shown and described in the aforesaid Sederberg application.

The endless band 12 is similarly supported by a plurality of horizontally spaced support rollers. These rollers are supported for rotation between parallel side plates or rails as more particularly shown and described in the aforesaid Sederberg application.

The endless bands 11 and 12 are driven in unison to move the material 14 in either of the longitudinal directions through rotation of drive rollers by a motor as more particularly shown and described in the aforesaid Sederberg application. Thus, the material 14 may be moved longitudinally relative to the cutting blade 16 through driving of the endless bands 11 and 12 in unison.

As previously mentioned, the frame 34, which carries the reciprocating motor 21 thereon, is slidably mounted on the rods 35. The frame 34 and the structure supported thereby are adapted to be moved upwardly from the position of FIG. 2 through actuation of a cable 160.

As shown in FIG. 2, one end of the cable 160 is attached to the motor 21. Accordingly, when the cable 160 is pulled upwardly, the frame 34, the motor 21, the cutting blade 16, the connecting means between the cutting blade 16 and the motor 21, the gear box 50 and related structure, and the rotary box 53 and related structure are lifted upwardly.

As shown in FIG. 11, the cable 160 passes around a pulley 161, which is rotatably mounted on an upstanding support 162 of the extension 151 of the housing 38. The cable 160 then extends around a pulley 163, which is rotatably mounted on the bridge 10.

The cable next passes around a pulley 164, which is rotatably mounted on a bifurcated support 165. The bifurcated support 165 is fixedly secured to one end of a piston rod 166 of a hydraulic cylinder 167, which is supported by the bridge 10. The cable 160 is connected through a turnbuckle to an arm 168 of the upstanding support 162 on the extension 151 of the housing 38.

During any transverse movement of the cutting blade 16 through the transverse passage or throat 15, there is no movement of the cable 160 to cause any raising or lowering of the cutting blade 16. This is because any shortening of the cable 160 between the pulley 161 and the pulley 163 due to movement of the housing 38 and the lower support frame 98 by energization of the motor 145 results in the length of the cable 160 between the pulley 164 and the arm 168 extending the same amount and vice versa. Therefore, the cutting blade 16 remains in the position in which it cuts the material 14 during reciprocation of the cutting blade 16.

If it is desired to lift the cutting blade 16 from cutting engagement with the material 14, fluid is supplied to the hydraulic cylinder 167 to retract the piston rod 166. Accordingly, the bifurcated support 165 is moved toward the cylinder 167. When this occurs, the distance between the pulleys 163 and 164 is lengthened whereby the motor 21, the cutting blade 16, the frame 34, and the connected structures are lifted.

Lifting of the cutting blade 16 may be regulated or controlled in accordance with the total thickness of the material 14 being cut. Thus, to rotate the cutting blade 16 with respect to the material 14 when a sharp corner or a notch is to be formed in the material 14, it is only necessary to have the connecting edge 18 of the cutting blade 16 clear the top of the material 14. Accordingly, by controlling the quantity of fluid supplied to the hydraulic cylinder 167, the height to which the cutting blade 16 is lifted is regulated or controlled.

The flow of fluid to the hydraulic cylinder 167 is stopped when an arm of an electric switch 170 (see FIG. 3), which is carried by the motor 21, engages an adjustable dog 171 to close the switch 170. The dog 171 is adjustable in a vertical direction by moving a knob 172 attached to the dog 171 through a pin 173. The pin 173 extends through a slot 174 in a longitudinal member 175, which extends downwardly from the upper plate 36. A spacer 175' also is carried by the pin 173 and has a reduced portion fitting into the longitudinal slot 174 from one side of the member 175 while the dog 171 has a shoulder fitting into the slot 174 from the other side of the member 175. Thus, the adjustable dog 171 is held in the adjusted position within the slot 174.

The front wall 39 of the housing 38 has a scale 176 (see FIGS. 1 and 3) thereon to indicate the total thickness of the material 14 being cut. A pointer 177, which is mounted on the pin 173 of the adjustable dog 171 and fixed to the spacer 175', cooperates with the scale 176 whereby the operator of the material cutting machine of the present invention may easily insure that the cutting blade 16 is raised to the desired height where the connecting edge 18 clears the top of the material 14.

The cutting blade 16 must have the cutting edges 17 and 18 sharpened at regular intervals to maintain the edges 17 and 18 sufficiently sharpened to cut the material. One suitable structure for sharpening the cutting blade 16 is shown and described in the copending patent application of Herman J. Baldwin for "Apparatus For Sharpening Reciprocating Cutting Blade of Material Cutting Machine," Ser. No. 726,697, filed May 6, 1968, and assigned to the same assignee as the assignee of the present application.

The sharpening structure of the aforesaid Baldwin application includes a pair of grinding wheels disposed on opposite sides of the cutting blade 16. When the cutting blade 16 is to be sharpened, one of the grinding wheels is moved into engagement with one side of each of the leading edge 17 and the connecting edge 18 of the cutting blade 16 during upward movement of the cutting blade 16, and the other of the grinding wheels is moved into engagement with the other side of the leading edge 17 and the connecting edge 18 of the cutting blade 16 when the cutting blade is returned to cutting engagement with the material 14.

In order to sharpen the entire length of the cutting blade 16, it is necessary to lift the cutting blade 16 a greater distance from the material 14 than is normally required when lifting the cutting blade 16 to form a sharp corner or notch in the material 14. Thus, it is necessary to render the switch 170, which limits the lifting of the cutting blade 16 when sharpening is not performed, inactive when the cutting blade 16 is to be sharpened by the grinding wheels of the sharpening unit.

The sharpening of the cutting blade 16 occurs when the cutting blade 16 is removed from the material 14 so as to form a sharp corner or notch in the material 14. However, the height to which the cutting blade 16 is lifted is much greater.

Since the entire pattern cut in the material 14 by the cutting blade 16 is controlled by a numerical control apparatus 182 (see FIG. 1), the instances when the cutting blade 16 must be lifted to a greater height than that required for merely notching or forming a sharp corner in the material 14 are programmed into the numerical control apparatus 182.

It should be understood that the specific pattern to be cut in the material is provided as an input to the numerical control apparatus 182. This input controls the output of the control apparatus 182 in the well-known manner to produce the desired movements to cut the desired pattern in the material 14. Thus, the input to the numerical control apparatus 182 is such that when sharpening of the cutting blade 16 is to occur, the numerical control apparatus 182 causes greater lifting of the cutting blade 16 than is normally produced when the cutting blade 16 is lifted to form a notch or sharp corner in the material 14.

Of course, the input to the numerical control apparatus 182 also determines when it is necessary to lift the cutting blade 16 from the material 14 to turn the cutting blade 16 with respect to its previous heading. Thus, when a small angle is to be cut in the material 14, the input to the numerical control apparatus 182 is such that rotation of the cutting blade 16 occurs about the axis 69 without the cutting blade 16 being lifted from cutting engagement with the material 14.

The numerical control apparatus 182 also receives the electrical feedback signals from the resolvers 52 and 101. Thus, the numerical control apparatus 182 controls the amount of rotation of the motors 51 and 99 and depends upon the feedback signals from the resolvers 52 and 101 to determine when rotation of the motors 51 and 99 is to stop.

To maintain the grinding wheels always properly positioned with respect to the cutting blade 16, it is necessary for the support structure for the grinding wheels to be rotated with the cutting blade 16 to maintain the desired angular relationship between the grinding wheels and the cutting blade 16. Accordingly, the grinding wheels are supported on a rotary plate 183, which is rotatably mounted on the fixed grinding wheel frame 41.

The rotary plate 183 has an orbiting stud 184 fixed thereto for rotation therewith. The orbiting stud 184 carries a grinding wheel support frame 185 thereon for rotation therewith. A spring loaded detent (not shown) on the frame 185 cooperates with a flat portion of the stud 184 to retain the frame 185 in a position in which the grinding wheels are spaced from the cutting blade 16 as more particularly shown and described in the aforesaid Baldwin application.

As more particularly shown and described in the aforesaid Baldwin application, the rotary plate 183 is rotated by the motor 51, which also rotates the cutting blade 16. Accordingly, the rotary plate 183 is rotated the same amount as the cutting blade 16 whereby the grinding wheels maintain their desired angular relationship to the cutting blade 16 during any rotation of the cutting blade 16.

Since the rotary plate 183 is rotatably mounted in the non-rotating grinding wheel frame 41, which does not move vertically, a ball spline 186 is rotatably mounted in the frame 41 and is driven by the pinion gear 58 through an idler gear 187 (see FIG. 14) and a gear 188 on a ball spline driver 189, which slides vertically on the ball spline 186. This permits the pinion gear 58 to move vertically relative to the spline 186 while still rotating the spline 186. It should be understood that both the gears 187 and 188 are rotatably mounted in the gear box 50.

The lower end of the spline 186 has a pinion gear 190 fixedly attached thereto. The pinion gear 190 drives a bull gear 191 on the rotary plate 183 through an idler gear 192, a pinion gear 193, a shaft 194, and a pinion gear 195. The gear 192 is fixedly secured to a shaft 196, which is rotatably mounted in the grinding wheel frame 41, and the pinion gear 193 is fixedly connected to the shaft 194, which also is rotatably mounted in the grinding wheel frame 41. The shaft 194 also has the pinion gear 195, which meshes with the bull gear 191, mounted thereon. Accordingly, energization of the motor 51 not only causes rotation of the cutting blade 16 but also rotates the rotary plate 183 whereby the grinding wheels maintain their desired angular relation to the cutting blade 16.

Thus, when sharpening of the cutting blade 16 is desired, it is necessary to move the frame 185 by overcoming the detent to pivot the frame 185 about the axis of the orbiting stud 184. Of course, the frame 185 still rotates with the stud 184 when the stud 184 is rotated with the rotary plate 183.

A pair of solenoids (one shown at 196′ in FIG. 2) is connected to opposite ends of the grinding wheel support frame 185 as more particularly shown and described in the aforesaid Baldwin application. Thus, energization of one of the solenoids causes the frame 185 to pivot in one direction about the axis of the orbiting stud 184 while energization of the other solenoid causes pivoting of the frame 185 about the axis of the orbiting stud 184 in the opposite direction. The solenoids are supported by the rotary plate 183 and rotate therewith.

When sharpening of the cutting blade 16 is to occur, the numerical control apparatus 182 not only causes energization of a motor 197 (see FIG. 2) to produce rotation of the grinding wheels as more particularly shown and described in the aforesaid Baldwin application but also energizes one of the solenoids before lifting of the cutting blade 16 occurs or during lifting thereof. As a result, one of the grinding wheels is moved into engagement with the side of the cutting blade 16 adjacent thereto to sharpen both the leading edge 17 and the connecting edge 18 as the cutting blade 16 is lifted upwardly. At this time, the cutting blade is mounted for rotation about its vertical axis 69.

The one grinding wheel is removed from engagement with the cutting blade 16 after the cutting blade 16 completes its upward movement. It is necessary to energize the other of the solenoids and de-energize the on solenoid before downward movement of the cutting blade 16 occurs. Thus, when the cutting blade 16 moves downwardly, the other of the grinding wheels is disposed for engagement with the side of the cutting blade 16 adjacent thereto. At this time, the cutting blade 16 is positioned to rotate about the vertical axis 73 and the other grinding wheel is appropriately located to engage the leading edge 17 and the connecting edge 18 of the cutting blade 16 during downward movement of the cutting blade 16.

It should be understood that the grinding wheel support frame 185 rotates with the stud 184 as the stud 184 rotates with the rotary plate 183 during rotation of the cutting blade 16 to form a notch or a sharp angle with respect to the previous cut formed in the material 14. This occurs even through the frame 185 has been pivoted with respect to the axis of the orbiting stud 184 by energization of one of the solenoids.

When the cutting blade 16 has returned into cutting engagement with the material 14, the other solenoid is de-energized whereby the frame 185 returns to the position in which the grinding wheels are spaced from the cutting blade 16. At the same time, motor 197 is de-energized to stop rotation of the grinding wheels.

As shown in FIG. 2, the material cutting machine of the present invention may utilize a pneumatic plate 198 for preventing humping or buckling of the material 14 adjacent the cutting blade 16. The pneumatic plate 198 is of the type more particularly shown and described in the copending patent application of Herman J. Baldwin for "Hold Down Plate For Use With Material Cutting Machine," Ser. No. 726,782, filed May 6, 1968, and assigned to the same assignee as the assignee of the present application.

The plate 198 is adjustably supported on a pair of diametrically disposed rods 199, which extend downwardly from the fixed grinding wheel frame 41 and are fixedly secured thereto. The plate 198 is supported on a frame 200, which is adjustable on the rods 199 through adjusting knobs 201.

As more particularly shown and described in the aforesaid Baldwin application for "Pneumatic Plate For Use With Material Cutting Machine," pneumatic pressure is employed to appropriately position the pneumatic plate 198 with respect to the top of the material. Furthermore, the rods 199 may have additional rods added thereto when the total thickness of the material 14 is reduced.

Considering the operation of the present invention, the material 14 is disposed on one of the endless bands 11 and 12 initially. It will be assumed that this is the band 11.

The movement in a longitudinal direction of the material 14 relative to the cutting blade 16 and the transverse movement of the cutting blade 16 realtive to the material 14 is controlled by the numerical control apparatus 182. As previously mentioned, the numerical control apparatus 182 also determines when the cutting blade 16 is lifted from engagement with the material 14 and rotated relative thereto.

The numerical control apparatus 182 produces the desired pattern on the material 14, which may be a plurality of layers of cloth, for example. As previously mentioned, this specific pattern is provided as an input to the apparatus 182.

With the material 14 disposed on the endless band 11, the motor, which drives the endless bands 11 and 12 in unison, is energized by the numerical control apparatus 182 to advance the material 14 longitudinally until one end of the material 14 is disposed for cutting engagement by the cutting blade 16. The numerical control apparatus 182 also has positioned the cutting blade 16 at the resired heading and at the desired transverse position in the transverse passage 15. Accordingly, cutting of the material 14 begins.

When it is desired to change the heading of the blade 16 to produce a cut at a sharp angle relative to the prior cut in the material 14, the blade 16 must be lifter from cutting engagement with the material 14 and the cutting blade 16 is rotated about the vertical axis 73 to change the heading of the blade 16. Thus, it is necessary to change the vertical axis of rotation of the cutting blade 16 from the axis 69 to the axis 73.

After rotation of the cutting blade 16 has been completed to provide the new heading for the cutting blade 16, it is necessary to return the cutting blade 16 into cutting engagement with the material 14. At the same time that the cutting blade 16 is returned into engagement with the material 14, the axis of rotation of the cutting blade 16 must be shifted from the axis 73 to the axis 69. The numerical control apparatus 182 automatically controls all of these movements.

Referring to FIGS. 18 to 27, there are shown the various movements of the cutting blade to cut a 90° corner in the material 14. As shown in FIGS. 18 and 19, the cutting blade 16 has created a longitudinal cut 202 in the material 14. The cut 202 is made by moving the material 14 from left to right in FIGS. 18 and 19 while the cutting blade 16 is reciprocated by the motor 21. When the leading edge 17 of the cutting blade 16 has moved relative to the material 14 to point 203 of the longitudinal cut 202 at which it is desired to form a cut 90° to the cut 202, further advancement of the material 14 through driving the endless bands 11 and 12 in unison is stopped by the numerical control apparatus 182.

The hydraulic cylinder 167 (see FIG. 11) is then actuated to move the bifurcated support 165 toward the left in FIG. 11. The amount of movement of the bifurcated support 165 toward the hydraulic cylinder 167 determines the amount of lifting of the cutting blade 16 from the material 14. As previously mentioned, it is necessary to lift the cutting blade 16 from cutting engagement with the material 14 but it is not necessary to lift the cutting blade 16 beyond a position at which the connecting edge 18 is no longer in cutting engagement with the material 14.

Acordingly, as previously mentioned, the adjustable dog 171 is positioned in accordance with the total thickness of the material 14 being cut. This causes the switch 170 to be actuated to stop the supply of hydraulic fluid to the cylinder 167 to control the amount of fluid supplied to the hydraulic cylinder 167 whereby the amount of lifting of the cutting blade 16 is regulated or controlled. Of course, the signal due to actuation of the switch 170 is supplied to the numerical control apparatus 182, which actually regulates the supply of fluid to the hydraulic cylinder 167.

The movement of the piston rod 166 results in the cutting blade 16 being removed from cutting engagement with the material 14. During this lifting of the cutting blade 16, the motor 21 continues to reciprocate the cutting blade 16.

After the cutting blade 16 has been raised so that the connecting edge 18 clears the top of the material 14, the solenoids 71 and 108 are energized. This results in the guide members 63 and 94 being moved laterally so that the axis of rotation of the cutting blade 16 and the stiffening rod 74 is now the vertical axis 73. As previously mentioned, the axis 73 is the longitudinal axis of the rod 74.

The supply of current to the solenoid 71 is from one of a plurality of slip rings 204 (see FIGS. 2 and 4) on the lower portion 44 of the vertically movable frame 34 through one of a plurality of brushes (not shown) attached to the rotary box 53. The supply of current to the solenoid 108 is from one of a plurality of slip rings 205 (see FIG. 13) on the lower support frame 98 through one of a plurality of brushes 206 on the rotary box 95.

Figure 28:
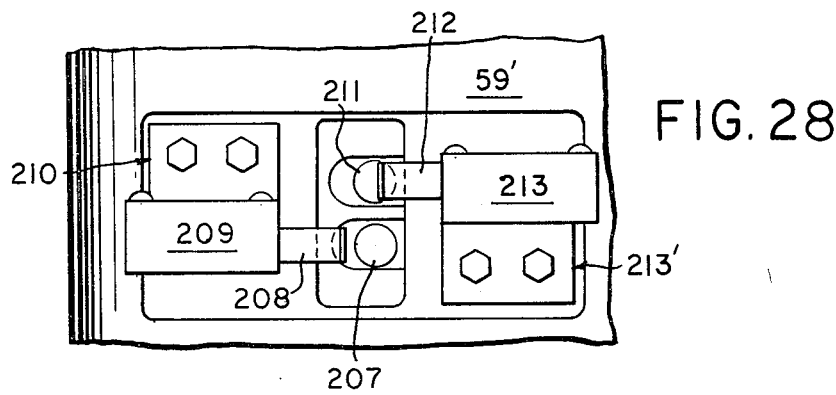
FIG. 28 is a side elevational view of the switch structure of FIG. 4 and taken along line 28—28 of FIG. 4.

When the guide members 63 and 94 are moved so that the axis of rotation is now the axis 73, a pin 207 (see FIG. 28) on the guide member 63 engages an arm 208 (see FIGS. 4 and 28) of a switch 209, which is mounted on the rotary box 53 through a bracket 210 to provide a signal that the guide member 63, which has the slider 28 slidably mounted therein, is now positioned so that the axis of rotation of the cutting blade 16 is the vertical axis 73. This signal is supplied to the numerical control apparatus 182 from the switch 209. Two other of the slip rings 204 and two other of the cooperating brushes are employed to provide electrical current to the switch 209.

A similar arrangement exists to indicate lateral movement of the guide member 94. Thus, there also is a switch and a cooperating pin in the same manner as described for the switch 209 and the pin 207.

The distance between the axes 69 and 73 is substantially the length of the cutting blade 16. Thus, the lateral movement of the cutting blade 16 results in the cutting blade 16 being advanced until the rod 74 is disposed at the point 203 in the cut 202 as shown in FIG. 20.

With the cutting blade 16 disposed as shown in FIG. 20, the motors 51 and 99 are energized by the numerical control apparatus 182 whereby the cutting blade 16 and the rod 74 are rotated about the vertical axis 73 to change the heading of the cutting blade 16. Accordingly, when it is desired to cut a 90° corner relative to the longitudinal cut 202, the cutting blade 16 is rotated 90° to position the cutting blade 16 at the new heading.

In this example, the cutting blade 16 is rotated clockwise (as viewed in FIGS. 19 and 20) from the position of FIG. 20 to the positon of FIGS. 21–23.

When the numerical control apparatus 182 senses that the cutting blade 16 has been rotated to the position of FIGS. 21–23, the piston rod 166 is actuated to return the bifurcated support 165 to the position of FIG. 11. This lowers the cutting blade 16 to return it into cutting engagement with the material 14 as shown in FIGS. 24–26.

Because the connecting edge 18 of the cutting blade 16 is sharpened, cutting of the material 14 occurs as soon as the connecting edge 18 engages the material 14. When the cutting blade 16 has returned to its lowermost position wherein the connecting edge 18 is cutting the material 14, a limit switch (not shown), which is carried by the frame 34, is closed through engagement of its arm with a dog (not shown) on the grinding wheel frame 41. This transmits a signal to the numerical control apparatus 182 to allow the numerical control apparatus 182 to both advance the cutting blade 16 relative to the material 14 and to de-energize the solenoids 71 and 108. This results in the guide members 63 and 94 being returned to the position in which the axis of rotation of the cutting blade 16 is the vertical axis 69.

The guide member 63 has a second pin 211 (see FIGS. 4 and 28) thereon for cooperation with an arm 212 of a switch 213, which also is mounted on the rotary box 53 through a bracket 213'. When the pin 211 engages the arm 212 of the switch 213, a signal is supplied to the numerical control apparatus 182 to indicate that the cutting blade 16 has returned to the position in which its axis of rotation is the vertical axis 69. This signal must be received by the numerical control apparatus 182 before any further rotation of the cutting blade 16 may occur.

With the numerical control apparatus 182 having received the signal to advance the cutting blade 16 relative to the material 14, the motor 145 is energized by the numerical control apparatus 182 to cause transverse movement of the cutting blade 16 through the transverse passage 15 by moving the housing 38 and the lower support frame 98 in sliding relation along the transverse ways 140 and 143, respectively. As shown in FIG. 27, this causes the blade 16 to produce a transverse cut 214, which is disposed perpendicular to the longitudinal cut 202, whereby a 90° corner is cut in the material 14.

When the cutting blade 16 has been moved out of engagement with the material 14, the stiffening rod 74 is still disposed within the bushing 87 because of the length of the rod 74. Therefore, the rod 74 serves as a guide to insure that the cutting blade 16 remains in a reciprocating plane both during lifting of the cutting blade 16 out of engagement with the material 14 and when the cutting blade 16 is in cutting engagement with the material 14. The rod 74 also insures that the cutting blade 16 always returns to the desired position after the cutting blade 16 has been lifted and returned into engagement with the material 14.

If it is desired to cut a notch in the material 14, the steps shown and described in FIGS. 18–23 will be carried out. This positions the cutting blade 16 so that it has the desired heading to form the notch.

The cutting blade 16 is then lowered to permit the connecting edge 18 of the cutting blade 16 to form the notch. Then the cutting blade 16 is again lifted.

The cutting blade 16 is next rotated to return it to its original heading. This rotation of the cutting blade 16 occurs about the vertical axis 73 as did the original rotation of the cutting blade 16 as previously described when forming a 90° corner.

After the cutting blade 16 has been returned to its original heading, the cutting blade 16 is again lowered so that the cutting blade 16 is again in cutting engagement with the material 14. Then, the solenoids 71 and 108 are de-energized and feeding of the cutting blade 16 relative to the material 14 occurs. This feeding of the cutting blade 16 relative to the material 14 is not simultaneous when forming a notch as when forming a 90° corner. Instead, the solenoids 71 and 108 must be de-energized as indicated to the numerical control apparatus 182 through the switch 213 being actuated by the pin 211 and the similar structure for tre guide member 94. It should be understood that this is necessary because de-energization of the solenoids 71 and 108 results in the cutting blade 16 being repositioned into the cut that it has already made.

As previously mentioned, sharpening of the cutting blade 16 occurs during one of the times when the cutting blade 16 is lifted out of cutting engagement with the material 14. When this occurs, the switch 170 is no longer effective to supply the signal to the numerical control apparatus 182 for stopping flow of fluid to the hydraulic cylinder 167. Instead, the switch 170 is rendered inactive, and the flow of fluid to the hydraulic cylinder 167 continues until a switch 215 (see FIG. 3), which is carried by the motor 21, is engaged by a dog 216, which is adjustably supported from the upper plate 36 of the housing 38. This results in the cutting blade 16 being lifted to the desired maximum height whereby the leading edge 17 and the connecting edge 18 may be sharpened by the grinding wheels in the manner shown and described in the aforesaid Baldwin application.

As previously mentioned, one of the grinding wheels is effective to sharpen the cutting blade 16 when the cutting blade 16 is moved upwardly since the cutting blade 16 has the axis 69 as its axis of rotation. The other of the grinding wheels is utilized to sharpen the cutting blade 16 during the downward movement of the cutting blade 16 when the cutting blade 16 is rotated about the axis 73. Accordingly, no down-time of the material cutting machine of the present invention is required for sharpening the cutting blade 16. Instead, it is only necessary to raise the cutting blade 16 higher than in most cycles of raising and lowering. The numerical control apparatus 182 controls energization of the motor 197 and the solenoids, which pivot the grinding wheel support frame 185 about the axis of the stud 184, to insure proper correlation between the grinding wheels and the cutting blade 16.

The electric supply to the solenoids, which pivot the frame 185, is supplied through three brushes (not shown) on the grinding wheel frame 41 cooperating with three slip rings (not shown), which are mounted for rotation with the rotary plate 183, as more particularly shown and described in the aforesaid Baldwin application. Thus, electrical current is always available for the solenoids.

While the foregoing description of the material cutting machine of the present invention has described cutting a sharp corner of 90° in the material 14, it should be understood that the cutting blade 16 may cut circles in the material 14 or form any angle relative to the previous cut in the material 14. When cutting a circle, the blade 16 has the leading edge 17 disposed tangent to the circle being formed. This insures that a true circle is cut in the material 14.

It is not always necessary to lift the cutting blade 16 from engagement with the material 14 to form a cut at an angle relative to the previous cut. For example, if it is desired to change the heading of the cutting blade 16 only 5°, this may be accomplished by merely rotating the cutting blade structure without lifting the cutting blade 16 from cutting engagement with the material 14. At this small angle, the slight curvature between the two cuts in the material 14 would be so small that it could not be readily distinguished from a sharp angle cut, which is produced when the cutting blade 16 is lifted from cutting engagement with the material 14 before the heading of the cutting blade 16 is changed.

Furthermore, in certain lightweight materials, the heading of the cutting blade 16 could be changed substantially without having to remove it from cutting engagement with the material 14. Of course, this would be utilized only where a sharp corner is not desired but a curved corner is permissible, and the waste of material is immaterial.

As previously mentioned, the numerical control apparatus 182 has the desired pattern programmed therein as an input. This input determines whether rotation of the cutting blade 16 may occur without the cutting blade 16 being lifted from cutting engagement with the material 14. The type of material, the thickness of each layer of material, and the total thickness of the material as well as the desired configuration to be cut in the material determines whether the cutting blade 16 must be lifted from the material 14 before it is rotated. If the material 14 is relatively heavy, any slight rotation of the cutting blade 16 may damage the cutting blade 16.

During any cutting of the material 14 by the cutting blade 16, it should be understood that the cutting blade 16 is rotatable about the axis 69. As a result, any force exerted by the material 14 on the cutting blade 16 tends to cause pivoting of the cutting blade 16 about he axis 69. As previously mentioned, the stop pin 82 on the slider 28 cooperates with the groove 81 in the support member 30, which has the cutting blade 16 attached thereto, to limit the amount of pivotal movement of the cutting blade 16 to approximately 5° from each side of its null position. The springs 83 and 84 cooperate with the projection 85 on the slider 28 to maintain the cutting blade 16 in its null or zero position unless a cutting force is exerted by the material 14. As previously mentioned, the support unit 89 has a similar arrangement. Thus, misalignment of the cutting blade 16 from its desired heading is substantially eliminated by the material cutting machine of the present invention.

The heading of the cutting blade 16 at any instant may be obtained through mounting a scale 217 (see FIG. 2) on the housing 38. A pointer 218, which cooperates with the scale 217, may be attached to the rotary plate 183. Accordingly, the pointer 218 rotates with the cutting blade 16 to indicate its heading.

While the material cutting machine of the present invention has been described as having the movable endless bands 11 and 12 move the material 14 longitudinally relative to the cutting blade 16, it should be understood that the endless bands 11 and 12 could be replaced by a support table in which a single flexible band does not move but has the transverse passage 15 therein move. One suitable example of this type of support table is shown and described in U.S. Pat. 3,262,348 to Wiatt et al. In this type of arrangement, the bridge 10 would have to be movable in a longitudinal direction to move the cutting blade 16 longitudinally relative to the material 14. The closure structure, which closes the transverse passage 15, also would have to be supported by the movable bridge 10 rather than the side plates of the table structure.

It also should be understood that the endless bands 11 and 12 of the support table of the aforesaid Wiatt et al. patent could be moved transversely relative to the cutting blade 16 rather than moving the cutting blade 16. It is only necessary for the material 14 and the cutting blade 16 to have both relative transverse and longitudinal movement between the material 14 and the cutting blade 16 to produce the desired results of the material cutting machine of the present invention.

While the cutting blade reciprocating structure has been shown as disposed above the material 14, it should be understood that this structure could be disposed beneath the endless bands 11 and 12 with the cutting blade 16 reversed. It is only necessary that the cutting blade 16 be reciprocated and be capable of being rotated.

The material 14 has been shown and described as a plurality of similar layers of the same material. However, it should be understood that the material 14 could comprise layers of different materials with the layers having the same or different thicknesses or layers of the same material of different thicknesses.

An advantage of this invention is that it eliminates fusing of material that fuses at relatively low temperatures. Another advantage of this invention is that it maintains alignment of the cutting blade. A further advantage of this invention is that it increases the speed of operation of a material cutting machine by reducing the time required to rotate the cutting blade.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

What is claimed is:

1. A material cutting machine comprising:
   a substantially vertical cutting blade;
   means to support material in a substantially horizontal plane to be cut by said cutting blade;
   motive means;
   means connecting said motive means to said cutting blade to cause reciprocation of said cutting blade when said motive means is activated;
   means to remove said cutting blade from cutting engagement with the material being cut;
   means to rotate said cutting blade to change the heading of the cutting edge of said cutting blade;
   and means to change the axis of rotation of said cutting blade in accordance with whether said cutting blade is in engagement with the material being cut or removed by said removal means from engagement with the material being cut.

2. The material cutting machine according to claim 1 in which said axis changing means includes means to move said connecting means laterally.

3. The material cutting machine according to claim 1 in which:
   said axis changing means includes:
      means to retain said cutting blade in a first position to be rotated about a vertical axis adjacent its leading edge when said cutting blade is in engagement with the material being cut;
      and means to overcome said retaining means when said cutting blade is removed by said removal means from engagement with the material being cut to move said cutting blade to a second position for rotation about a vertical axis adjacent its trailing edge.

4. The material cutting machine according to claim 3 in which:
   said retaining means cooperates with said connecting means to retain said cutting blade in its first position;
   and said overcoming means cooperates with said connecting means to move said cutting blade to its second position.

5. The material cutting machine according to claim 1 including means to limit the amount of removal of said cutting blade.

6. The material cutting machine according to claim 5 including means to vary the position of said limiting means in accordance with the total thickness of the material being cut.

7. The material cutting machine according to claim 1 in which said connecting means has means to limit pivotal movement of said cutting blade about its vertical axis adjacent its leading edge when the material is being cut and exerting a force on said cutting edge.

8. The material cutting machine according to claim 7 including means to maintain said cutting blade at its null position when the material being cut does not exert a force on said cutting blade.

9. The material cutting machine according to claim 1 including:
   guide means cooperating with the end of said cutting blade remote from said motive means to maintain said cutting blade in its reciprocating plane, said guide means being fixed against reciprocation;
   and means to rotate said guide means with said cutting blade.

10. The material cutting machine according to claim 1 including means to indicate the axis of rotation about which said cutting blade rotates.

11. The material cutting machine according to claim 1 in which said removal means moves said cutting blade, said motive means, and said connecting means.

12. The material cutting machine according to claim 9 including means to move said guide means simultaneously with said cutting blade when said cutting blade has its axis of rotation changed by said axis changing means.

13. The material cutting machine according to claim 1 in which:
   said rotating means includes a rotary box;
   said axis changing means includes:
      a guide member disposed in said rotary box and having a portion of said connecting means disposed therein and extending therethrough;
      means acting on said guide member to retain said cutting blade in a first position to be rotated about a vertical axis adjacent its leading edge when said cuting blade is in engagement with the material being cut;
      and means acting on said guide member to overcome said retaining means when said cutting blade is removed by said removal means from engagement with the material being cut to move said cutting blade to a second position for rotation about a vertical axis adjacent its trailing edge.

14. The material cutting machine according to claim 13 in which said retaining means and said overcoming means are supported by said rotary box.

References Cited

UNITED STATES PATENTS

| | | | |
|---|---|---|---|
| 1,172,058 | 2/1916 | Scheyer | 83—561 X |
| 3,184,158 | 5/1965 | Beeren et al. | 83—215 X |
| 3,245,295 | 4/1966 | Mueller | 83—428 X |
| 3,304,820 | 2/1967 | Mueller | 83—428 X |

JAMES M. MEISTER, Primary Examiner

U.S. Cl. X.R.

83—427, 428, 527, 559, 635, 647, 563, 556

UNITED STATES PATENT OFFICE
CERTIFICATE OF CORRECTION

Patent No. 3,511,124　　　　　　　　　　　　　　　　May 12, 1970

Edward C. Bruns

It is certified that error appears in the above identified patent and that said Letters Patent are hereby corrected as shown below:

Column 1, line 47, "cuting" should read -- cutting --; line 48, "cuting" should read -- cutting --. Column 2, line 6, "cuting" should read -- cutting --. Column 4, line 61, cancel the period; line 63, after the closing parenthesis insert a period. Column 10, line 30, after "parallel" insert a comma. Column 13, line 29, cancel "opposite direction. The solenoids are supported by the" and insert the same after "the", third occurrence, in line 26; line 45, "on" should read -- one --; line 68, after the comma insert -- the --. Column 14, line 24, "realtive" should read -- relative --; line 42, "re-" should read -- de- --; line 47, "lifter" should read -- lifted --; line 50, cancel "is". Column 17, line 3, "tre" should read -- the --. Column 18, line 17, "he" should read -- the --. Column 20, line 3, "edge" should read -- blade --; line 36, "cuting" should read -- cutting --.

Signed and sealed this 12th day of January 1971.

(SEAL)
Attest:

EDWARD M. FLETCHER, JR.　　　　　　　　　　WILLIAM E. SCHUYLER, JR.
Attesting Officer　　　　　　　　　　　　　　Commissioner of Patents